(12) United States Patent
Bortoli et al.

(10) Patent No.: US 9,758,217 B2
(45) Date of Patent: Sep. 12, 2017

(54) DERAILLEUR OF A BICYCLE GEARSHIFT AND METHOD FOR ELECTRONICALLY CONTROLLING A BICYCLE GEARSHIFT

(71) Applicant: Campagnolo S.r.l., Vicenza (IT)

(72) Inventors: Alberto Bortoli, Altavilla Vicentina Vicenza (IT); Gianluca Bortolozzo, Cavarzere Venezia (IT); Paolo Pasqua, Camisano Vincentino Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/955,935

(22) Filed: Dec. 1, 2015

(65) Prior Publication Data

US 2016/0152301 A1  Jun. 2, 2016

(30) Foreign Application Priority Data

Dec. 2, 2014 (IT) .............................. MI2014A2069

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/122 | (2010.01) |
| B62M 9/124 | (2010.01) |
| B62M 9/1242 | (2010.01) |
| B62M 9/132 | (2010.01) |
| B62M 9/134 | (2010.01) |

(52) U.S. Cl.
CPC ............ *B62M 9/122* (2013.01); *B62M 9/124* (2013.01); *B62M 9/1242* (2013.01); *B62M 9/132* (2013.01); *B62M 9/134* (2013.01); *B62M 2009/12413* (2013.01)

(58) Field of Classification Search
CPC .... B62M 9/122; B62M 25/08; B62M 9/1248; B62M 9/1244; B62M 9/126
USPC ....................................................... 474/80, 82
See application file for complete search history.

(56) References Cited

U.S. PATENT DOCUMENTS 3,742,777 A * 7/1973 Mathauser ............. B62M 25/08
474/110
4,627,827 A * 12/1986 Juy ........................ B62M 9/126
474/80

(Continued)

FOREIGN PATENT DOCUMENTS

| EP | 0542077 A1 | 5/1993 |
| EP | 1279929 A2 | 1/2003 |

OTHER PUBLICATIONS

Italian Search Report and Written Opinion in Italian Application No. IT MI2014A002069 with English translation.

(Continued)

*Primary Examiner* — Henry Liu
(74) *Attorney, Agent, or Firm* — Volpe and Koenig, P.C.

(57) ABSTRACT

A bicycle derailleur for operating a chain guide. The derailleur has primary actuator that imparts a primary displacement on the chain guide that has at least a component in an axial direction with respect to an assembly of toothed wheels. The derailleur also has secondary actuator that imparts a secondary displacement on the chain guide that has at least a component in a radial direction with respect to the assembly of toothed wheels. The secondary actuator can operate independently of the primary actuator.

13 Claims, 32 Drawing Sheets

(56) References Cited

U.S. PATENT DOCUMENTS

| | | | | |
|---|---|---|---|---|
| 4,690,663 A * | 9/1987 | Nagano | B62M 9/125 | 474/80 |
| 4,946,425 A * | 8/1990 | Buhlmann | B62M 9/122 | 192/142 R |
| 5,358,451 A * | 10/1994 | Lacombe | B62M 9/122 | 474/78 |
| 5,498,211 A * | 3/1996 | Hsu | B62M 9/1248 | 474/80 |
| 5,961,409 A * | 10/1999 | Ando | B62M 9/1244 | 474/80 |
| 6,012,999 A * | 1/2000 | Patterson | B62M 9/122 | 474/104 |
| 6,042,495 A * | 3/2000 | Patterson | B62M 9/122 | 474/78 |
| 6,325,733 B1 * | 12/2001 | Patterson | B62M 9/122 | 280/216 |
| 6,350,212 B1 * | 2/2002 | Campagnolo | B62M 9/126 | 474/80 |
| 6,685,586 B2 * | 2/2004 | Dal Pra' | B62M 9/16 | 474/80 |
| 7,090,603 B2 * | 8/2006 | Shahana | B62J 23/00 | 474/80 |
| 7,373,232 B2 * | 5/2008 | Guderzo | B62M 9/122 | 474/116 |
| 7,563,186 B2 * | 7/2009 | Mercat | B62M 25/08 | 474/70 |
| 7,572,199 B1 * | 8/2009 | Calendrille, Jr. | B62M 9/16 | 474/80 |
| 7,614,972 B2 * | 11/2009 | Oseto | B62M 9/1244 | 474/80 |
| 8,870,693 B2 * | 10/2014 | Shahana | B62M 9/121 | 474/80 |
| 2004/0235597 A1 * | 11/2004 | Guderzo | B62M 9/122 | 474/70 |
| 2006/0116227 A1 * | 6/2006 | Mercat | B62M 9/12 | 474/82 |
| 2006/0194660 A1 * | 8/2006 | Shahana | B62M 9/12 | 474/82 |
| 2009/0098963 A1 * | 4/2009 | Watarai | B62K 23/06 | 474/80 |
| 2009/0291789 A1 * | 11/2009 | Ishikawa | B62M 9/1248 | 474/82 |
| 2012/0258827 A1 * | 10/2012 | Ishikawa | B62M 9/1248 | 474/80 |
| 2012/0322591 A1 * | 12/2012 | Kitamura | B62J 6/06 | 474/80 |
| 2013/0090196 A1 * | 4/2013 | Yamaguchi | B62M 9/1244 | 474/80 |
| 2013/0130853 A1 * | 5/2013 | Bohm | B62M 9/1244 | 474/80 |
| 2014/0032067 A1 * | 1/2014 | Miglioranza | F16H 9/04 | 701/60 |
| 2014/0162817 A1 * | 6/2014 | Yamaguchi | B62M 9/122 | 474/80 |
| 2014/0162818 A1 * | 6/2014 | Yamaguchi | F16H 61/68 | 474/80 |
| 2014/0243129 A1 * | 8/2014 | Pasqua | B62M 9/1242 | 474/82 |
| 2014/0296009 A1 * | 10/2014 | Suyama | B62M 9/122 | 474/80 |

OTHER PUBLICATIONS

Italian Search Report and Written Opinion in Italian Application No. IT MI2014A002070 with English translation.

* cited by examiner

DERAILLEUR OF A BICYCLE GEARSHIFT AND METHOD FOR ELECTRONICALLY CONTROLLING A BICYCLE GEARSHIFT

CROSS REFERENCE TO RELATED APPLICATIONS

This application claims the benefit of Italian Application No. MI2014A002069, which was filed on Dec. 2, 2014 and is incorporated herein by reference as if fully set forth.

FIELD OF INVENTION

The present invention relates to a derailleur of a bicycle gearshift, preferably an electronically servo-assisted bicycle gearshift, as well as to a method for electronically controlling a bicycle gearshift.

BACKGROUND

Field of the Invention

A motion transmission system in a bicycle comprises a chain extending between toothed wheels associated with the axle of the pedal cranks and with the hub of the rear wheel. When there is an assembly of toothed wheels comprising more than one toothed wheel at at least one of the axle of the pedal cranks and the hub of the rear wheel, and the motion transmission system is therefore provided with a gearshift, a front derailleur and/or a rear derailleur are provided for.

In high-performance bicycles, and particularly in bicycles used in sports competitions, characteristics that are very important to the cyclist are the speed and precision with which gearshifting can be performed. Particularly for this reason, so-called electronic gearshifts, or more specifically electronically servo-assisted gearshifts, have become common.

In case of an electronically servo-assisted gearshift, each derailleur comprises a guide element—also known as chain guide or cage or, in case of a rear derailleur, rocker arm—movable to displace the chain among the toothed wheels in order to change the gear ratio, and an electromechanical actuator to displace the chain guide. The actuator in turn typically comprises a motor, typically an electric motor, coupled with the chain guide through a linkage such as an articulated parallelogram, a rack system or a worm screw system, as well as a sensor or transducer of the position, speed, acceleration and/or direction of rotation of the rotor or of any moving part downstream of the rotor, down to the chain guide itself. It is worthwhile noting that slightly different terminology from that used in this context is also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or the gear ratio is changed based on commands manually input by the cyclist through suitable control members, for example levers and/or buttons.

A device or unit for controlling the front derailleur and a device or unit for controlling the rear derailleur—or only one of the two in case of simpler gearshifts—are mounted so as to be easily manoeuvred by the cyclist, normally on the handlebars, close to the handgrips thereof where the brake lever is also located for controlling the brake of the front and rear wheel, respectively. Control devices that allow to drive both a derailleur in the two directions and a brake are commonly called integrated controls.

It is in general known to drive the derailleur of a bicycle gearshift with reference to values of a table of command values, each correlated to a position of the derailleur in which engagement of the chain with a specific toothed wheel occurs or there is. In other words, the control electronics or controller uses the table of command values to obtain the value that a variable of the derailleur must take to position the chain in engagement with the desired toothed wheel. Such a value can be a differential value with respect to the adjacent toothed wheel, or it can be an absolute value with respect to a reference, for example with respect to a reference toothed wheel or to an end of stroke condition or a condition of lack of excitation of the motor.

From the point of view of magnitude, an actuator command value of the table of values can be, for example, the distance travelled by a mobile point taken as a reference on the derailleur, the number of steps or revolutions that the motor should be made to perform, a length of excitation time of the motor, the value of a supply voltage of a motor having an excursion proportional to the voltage, or furthermore it can be the value emitted by the sensor or transducer associated with the motor, a numerical value stored in a register and representative of one of the aforementioned quantities, etc.

In particular, the motors of actuators can be driven for a number of steps or for a length of excitation time or with a voltage that are appropriate for each upward or downward gearshifting and then stopped automatically, while the sensors are used to provide a feedback signal to the control electronics so that it can possibly take care of actuating the motors of the actuators again in case the intended position has not been reached, namely in case the aforementioned variable of the derailleur has not taken the table value. This may, for example, be due to the fact that the resistance torque offered by the derailleur, which is to a certain extent dependent on how the cyclist is pedalling, was too high, greater than the maximum torque able to be delivered by the motors through the linkage.

The values of said table of command values are nominal values, set in the factory, which take the number of toothed wheels in the derailleur (front or rear) and the respective thicknesses and pitches into account. Typically, such nominal values provide that, in the absence of the actuator driving signal, namely with command value at zero, the chain is in engagement with the toothed wheel having the smallest diameter, although, as can be seen from the aforementioned examples, this condition is not necessary.

Although with electronically servo-assisted gearshifts it has been possible to improve precision and speed of gearshifting, there is still a need to improve these performances, in order to be able to assist the cyclist in achieving better and better results in competition and protect the mechanics.

This requirement is clearly of increasing importance the more the gearshift is intended to be used in high-level cycling competitions.

In order to obtain high precision of control of known bicycle gearshifts, an initial adjustment of the bicycle is carried out in order to optimize the tensioning of the chain depending on the configuration and structure of the frame and the assembly of toothed wheels, both the front ones (crowns) associated with the axle of the pedal cranks, and the rear ones (sprockets) associated with the rear wheel.

It is possible to adapt the command values of the table so that they accurately correspond to the electromechanical components of the specific gearshift, in particular to the pitches of the toothed wheels and/or to the mutual position of the elements of the motor or of the linkage taken as fixed reference and as mobile reference, as well as possibly to the progress of the actuation voltage of the motor, to the speed, acceleration and/or direction of rotation of the motor, etc.

Moreover, the initial adjustment typically acts on at least one spring provided for in the transmission, possibly setting a preload on it, in order to keep the correct tension of the transmission chain in the different travel configurations.

In some gearshifts, used particularly for road bicycles, there are two chain tensioning springs counteracting to determine the setup of the chain guide when engaged with the transmission chain. This allows greater versatility of the system, providing it with high elasticity. Other gearshifts, on the other hand, can provide for only one chain tensioning spring.

Prior Art

According to the prior art, the initial preload setting of the chain tensioning spring(s) is so carried out as to bring the chain guide radially as close as possible to the toothed wheels.

Indeed, a short distance between the chain guide and the toothed wheels determines greater sensitivity of control since, in such conditions, the chain guide displacement component parallel to the axis of the toothed wheels corresponds to a slope exerted on the chain that is sufficient to trigger a displacement from one toothed wheel to the other.

Bringing the chain guide closer to the toothed wheels does, however, have a limitation dictated by the toothed wheel of maximum diameter. Indeed, bringing it too close to the toothed wheel of maximum diameter is the cause of drawbacks such as the feeling of a rough gearshift between the gear ratio that uses such a toothed wheel and the next one, as well as scraping between the chain and the chain guide in case the chain is engaged with the toothed wheel of maximum diameter while pedalling backwards. In such conditions, the transmission can also be annoyingly noisy.

In order to improve the precision of gearshifting, the Applicant recently proposed, in the patent application published as US 2014/0243129, to provide for the preload of the chain tensioning spring to be adjusted as a function of the primary displacement of the chain guide in the direction of the axis of the assembly of toothed wheels, and in particular for it to be a mechanical consequence of the primary displacement of the chain guide. In this way, the radial distance of the chain guide from the axis of the assembly of toothed wheels changes depending on which toothed wheel is engaged with the chain; in particular, the distance from the axis will be increasingly greater as the diameter of the toothed wheel engaged by the chain increases.

The problem at the basis of the present invention is to further improve precision and speed of gearshifting in a derailleur of a bicycle gearshift.

SUMMARY OF THE INVENTION

The invention provides a bicycle gearshift derailleur with a mobile chain guide that has actuators for both primary and secondary displacements. The primary displacement of the mobile chain guide has a component in an axial direction with respect to an axis of an assembly of toothed wheels. The secondary displacement of the mobile chain guide has a component in a radial direction with respect to the axis of an assembly of toothed wheels. The second actuator can move the mobile chain guide independently of the primary actuator.

The secondary displacement independent of the primary displacement makes it is possible to ensure that the mobile unit—and in particular the chain guide—is always in the ideal position with respect to the assembly of toothed wheels. Typically, during gearshifting it will be in a position relatively radially close to the toothed wheels, while during normal travel it will be in a position relatively radially far.

BRIEF DESCRIPTION OF THE DRAWINGS

The features and advantages of the present invention will become clearer from the following detailed description of some preferred embodiments thereof, made with reference to the attached drawings. The different features in the single configurations can be combined as desired. In such drawings, FIG. 1 schematically shows the present invention.

DETAILED DESCRIPTION OF THE PREFERRED EMBODIMENTS

Introduction

Figure 1:
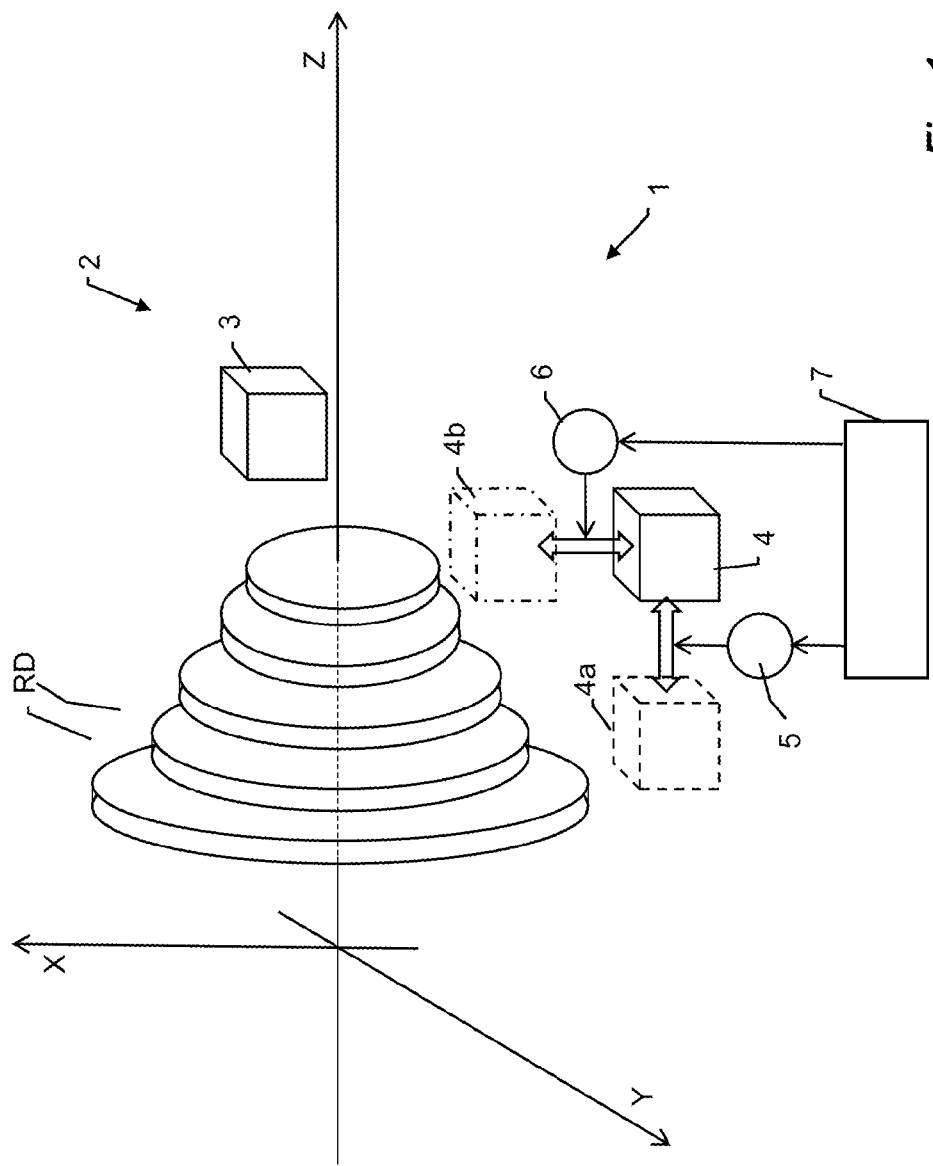

In one aspect, the invention relates to a derailleur of a bicycle gearshift, comprising:

a support unit, configured to be mounted on a bicycle frame at an assembly of coaxial toothed wheels of the gearshift, a mobile unit, comprising a chain guide, primary actuation means configured to move the mobile unit with respect to the support unit so as to impart onto the chain guide a primary displacement having at least a component in axial direction with respect to an axis of the assembly of toothed wheels, characterized by further comprising:

secondary actuation means configured to move the mobile unit with respect to the support unit so as to impart onto the chain guide a secondary displacement having at least a component in radial direction with respect to the axis of the assembly of toothed wheels, wherein the secondary actuation means are capable of moving the mobile unit independently of the primary actuation means.

Thanks to the secondary displacement independent of the primary displacement, it is possible to ensure that the mobile unit—and in particular the chain guide—is always in the ideal position with respect to the assembly of toothed wheels. Typically, during gearshifting it will be in a position relatively radially close to the toothed wheels, while during normal travel it will be in a position relatively radially far. Moreover, the radial distance (both in close position and in far position) can be suitably selected according to the diameter of the toothed wheel on which the chain is engaged, thus being able to always be the one most suited to the circumstances at hand. More in general, it is possible to change the radial distance during normal travel and/or gearshifting.

In this way it is possible to speed up gearshifting without necessarily having to increase the speed of a motor of the primary actuation means, because the chain can be kept as close as possible to the toothed wheels during gearshifting.

Typically, the primary displacement imparted by the primary actuation means also has a component in the radial direction and/or a component in the circumferential direction, with respect to the axis of the assembly of toothed wheels.

The secondary displacement imparted by the secondary actuation means has a possible component in the circumferential direction, however it has no component in the axial direction.

Preferably, the derailleur is a rear derailleur.

Preferably:

the support unit comprises a support body and a first fixing unit, for mounting the support body on the frame;

the mobile unit comprises a mobile body and a second fixing unit, for mounting the chain guide on the mobile body;

a chain tensioning spring is provided for in at least one of the first fixing unit and the second fixing unit, the chain tensioning spring determining a setup of the chain guide when engaged with a bicycle transmission chain;

the secondary actuation means comprise a linkage for adjusting the preload of the chain tensioning spring, so as to determine a change in the setup of the chain guide that involves the secondary displacement of the chain guide.

As stated above, the chain tensioning spring (or springs) is responsible for the dynamic equilibrium that determines the setup of the chain guide and eventually the setup of the chain, which also comprises the radial distance of the chain guide from the axis of the assembly of toothed wheels. Thus by changing the preload of this spring (or of at least one of these springs, if there is more than one) the desired change of the position of the chain guide with respect to the axis of the assembly of toothed wheels is caused.

Preferably, the derailleur is of the articulated parallelogram type, with one fixed side and one mobile side opposite the fixed side and connected to it by two connecting rods of equal length, wherein the fixed side is formed by the support body and the mobile side is formed by the mobile body. However, the invention is also applicable to derailleurs with a different configuration.

In a preferred embodiment:

the first fixing unit comprises:

a pivot intended to be mounted fixed on the frame, the support body and the chain tensioning spring being rotatably mounted on the pivot, a first ring, rotatably mounted on the pivot, provided with a tooth for resting on the frame and with a seat in engagement with a first end of the chain tensioning spring;

and furthermore:

the linkage for adjusting the preload of the chain tensioning spring comprises:

a second ring, rotatably mounted in the support body and on the pivot, provided with a seat in engagement with a second end of the chain tensioning spring, a toothed sector formed on the second ring, a worm screw in engagement with the toothed sector.

In this embodiment, therefore, the chain tensioning spring on which the linkage for adjusting the preload acts is arranged in the first fixing unit, thus in the support unit. In this condition, the additional components necessary in the derailleur to implement the invention are substantially all provided in the support unit, i.e. in a unit mounted directly on the frame of the bicycle and subject to limited movements and deformations; in this way, therefore, there is the dual advantage that the bulk of the derailleur is not substantially increased and that the secondary actuation means are in a relatively protected position against possible impacts during use of the bicycle.

In an alternative embodiment:

the second fixing unit comprises:

a pivot mounted in the mobile body, the chain guide and the chain tensioning spring being rotatably mounted on the pivot, a seat formed in the chain guide, in engagement with a first end of the spring;

and wherein:

the linkage for adjusting the preload of the chain tensioning spring comprises:

a ring, rotatably mounted in the mobile body and provided with a seat in engagement with a second end of the chain tensioning spring, a toothed sector formed on the ring, a worm screw in engagement with the toothed sector.

In this embodiment, therefore, the chain tensioning spring on which the linkage for adjusting the preload acts is arranged in the second fixing unit, thus in the mobile unit. In this condition, the additional components necessary in the derailleur to implement the invention are substantially all provided in the mobile unit, i.e. in a unit mounted in significantly protruding position with respect to the frame of the bicycle; in this way, therefore, it is easier to gain access thereto, for adjustments, calibrations, maintenance, cleaning and the like.

In a preferred embodiment, the primary actuation means comprise a first electric motor and the secondary actuation means comprise a second electric motor.

The use of separate motors, able to be driven independently for the first and the second actuation means allows the maximum freedom in choosing the motors most suitable for the specific conditions of use. In particular, it is possible to keep the conventional configuration for the primary actuation means, including the motor. It also makes it easy to obtain the independence of the primary and secondary displacements.

With this embodiment it is also possible to have simultaneous operation—where necessary—of the primary and secondary actuation means.

In an alternative embodiment, the primary actuation means and the secondary actuation means comprise a single shared electric motor, with a transmission being provided for having a primary output and a secondary output respectively associated with the primary actuation means and with the secondary actuation means. Also with this embodiment it is possible, although more complicated, to have simultaneous operation of the primary and secondary actuation means.

The use of a single motor for both the primary and secondary actuation means makes it possible to avoid the weight, the bulk and the cost of a second motor and of the relative control systems. Indeed, the weight, the bulk and the cost of an electric motor with the suitable power are greater than those of the transmission.

Preferably, the transmission comprises:
a primary shaft set in rotation by the single electric motor,
a primary toothed wheel, fixedly fitted on the primary shaft,
a first secondary shaft and a second secondary shaft, parallel to one another and to the primary shaft,
a first secondary toothed wheel, fixedly fitted on the first secondary shaft,
a second secondary toothed wheel, fixedly fitted on the second secondary shaft,
an auxiliary toothed wheel, mounted in an axially mobile manner along an auxiliary axis parallel to the primary and secondary shafts, in meshed engagement permanently with the primary toothed wheel and selectively with one and/or the other of the secondary toothed wheels.

This configuration can be easily implemented, obtaining a simple and reliable and very compact transmission.

Preferably, a reduction stage is arranged between the electric motor and the primary shaft, to allow an ordinary electric motor (that operates at a relatively high rotation speed) to be used, although at the two primary and secondary outputs a much lower angular speed is necessary.

Preferably, the auxiliary toothed wheel is fixedly fitted on an auxiliary shaft, rotatably carried by a slide guided in a mobile manner along the auxiliary axis.

More preferably, said slide is actuated by an electromagnetic actuator.

The electromagnetic actuator preferably comprises a push-pull electromagnet.

Alternatively, the auxiliary toothed wheel is axially slidably fitted on a non-sliding auxiliary shaft extending along the auxiliary axis, and is actuated for this purpose by a suitable actuator.

In one aspect, the invention relates to a method for electronically controlling a bicycle gearshift comprising a support unit configured to be mounted on a bicycle frame at an assembly of coaxial toothed wheels of the gearshift and a mobile unit comprising a chain guide, said method comprising the steps of:
moving the mobile unit with respect to the support unit so as to impart onto the chain guide a primary displacement having at least a component in axial direction with respect to an axis of the assembly of toothed wheels,
characterized by further comprising the step of:
moving the mobile unit with respect to the support unit so as to impart onto the chain guide a secondary displacement having at least a component in radial direction with respect to the axis of the assembly of toothed wheels, wherein said step of moving the mobile unit with respect to the support unit so as to impart onto the chain guide a secondary displacement is carried out independently of said step of moving the mobile unit with respect to the support unit so as to impart onto the chain guide a primary displacement.

Preferably the method comprises, in order to carry out gearshifting, the steps of:
a) driving the primary actuation means to displace the mobile unit between a position of engagement of a starting toothed wheel of the assembly of toothed wheels and a position of engagement of a destination toothed wheel of the assembly of toothed wheels; and
b) driving the secondary actuation means to displace the mobile unit radially with respect to an axis of the assembly of toothed wheels.

More specifically, the method comprises, in order to carry out gearshifting, the step of:
a) driving the primary actuation means to displace the mobile unit between a position of engagement of a starting toothed wheel of the assembly of toothed wheels and a position of engagement of a destination toothed wheel of the assembly of toothed wheels;
and at least one of the steps of:
b1) driving the secondary actuation means to bring the mobile unit radially closer to the assembly of toothed wheels; and
b2) driving the secondary actuation means to bring the mobile unit radially farther from the assembly of toothed wheels.

In a preferred embodiment, the three steps a), b1) b2) are all provided for. However, considering that the toothed wheels have different diameters, for some or all gearshifting it is possible to omit one of the two displacements in the radial direction of steps b1) and b2). In particular, if the gearshifting is downward gearshifting, from a toothed wheel having a larger diameter to a toothed wheel having a smaller diameter, the primary displacement obtained in step a) already involves adequately bringing radially farther from the destination toothed wheel, so that step b2) can be omitted. Vice-versa, if the gearshifting is upward gearshifting, from a toothed wheel having a smaller diameter to a toothed wheel having a larger diameter, the primary displacement obtained in step a) already involves adequately bringing radially closer to the destination toothed wheel, so that step b1) can be omitted.

In embodiments, steps b1) where provided for, a) and b2) where provided for, are sequential to each other.

In embodiments, step b1) is at least partially simultaneous with step a), and step b2) is sequential to steps a) and b1).

In embodiments, step b1) is at least partially simultaneous with step a) and/or step b2) is at least partially simultaneous with step a).

Step a) can comprise a step of driving the primary actuation means to displace the mobile unit between a position of engagement of a starting toothed wheel of the assembly of toothed wheels and a temporary position different from a position of engagement of a destination toothed wheel of the assembly of toothed wheels.

More preferably, a step of staying of the mobile unit in the temporary position for a predetermined time period is further comprised.

Even more preferably, a step of driving the primary actuation means to displace the mobile unit from the temporary position to a position of engagement of the destination toothed wheel is further comprised.

In this way it is possible to carry out so-called gearshifting "with overstroke", for example wherein the chain is brought beyond the destination toothed wheel for a certain time and then, when actually engaged, it is brought back on the destination toothed wheel.

The stay in temporary position takes place deliberately for the predetermined time period, namely measures are taken, or means are implemented, suitable for monitoring the passing of the predetermined time period.

Alternatively or in addition, step a) can comprise driving the primary actuation means to displace the mobile unit between a position of engagement of a starting toothed wheel of the assembly of toothed wheels and a position of engagement of a destination toothed wheel of the assembly of toothed wheels not immediately adjacent to the starting toothed wheel in the assembly of toothed wheels, directly or with a stop/stops at the/each intermediate toothed wheel between the starting toothed wheel and the destination toothed wheel.

In this way, multi-gearshifting is obtained in which the secondary displacement in the radial direction occurs only at the start and/or at the end of the multi-gearshifting.

Alternatively, multi-gearshifting can be obtained as a series of individual gearshiftings close together in time, namely with secondary displacement in the radial direction, of bringing closer and/or farther, also at the or each intermediate toothed wheel and not only at the starting toothed wheel and/or the destination toothed wheel.

In particular, step a) can comprise the steps of:

a1) driving the primary actuation means to displace the mobile unit between a position of engagement of the starting toothed wheel and a position of engagement of a first toothed wheel intermediate between the starting toothed wheel and the destination toothed wheel;

a2) driving the primary actuation means to displace the mobile unit between the position of engagement of the first intermediate toothed wheel and the position of engagement of the destination toothed wheel;

and between said steps a1) and a2) there is at least one of the steps b11) and b21) of:

b11) driving the secondary actuation means to bring the mobile unit (4) radially closer to the first intermediate toothed wheel;

b21) driving the secondary actuation means to bring the mobile unit radially farther from the first intermediate toothed wheel.

In case of triple gearshifting, step a2) comprises the steps of:

a21) driving the primary actuation means to displace the mobile unit between the position of engagement of the first intermediate toothed wheel and a position of engagement of a second intermediate toothed wheel of the assembly of toothed wheels, the second intermediate toothed wheel being intermediate between the first intermediate toothed wheel and the destination toothed wheel; and a22) driving the primary actuation means to displace the mobile unit between the position of engagement of the second intermediate toothed wheel and the position of engagement of the destination toothed wheel, and between said steps a21) and a22) there is preferably at least one of the steps b12) and b22) of:

b12) driving the secondary actuation means to bring the mobile unit radially closer to the second intermediate toothed wheel, b22) driving the secondary actuation means to bring the mobile unit radially farther from the second intermediate toothed wheel.

Similarly, it is possible to carry out quadruple, quintuple gearshifting, etc. in a recursive manner.

Alternatively or in addition to carrying out gearshifting as described above, the method preferably comprises, during normal travel, the steps of:

c) checking whether the current position of the mobile unit with respect to the assembly of toothed wheels corresponds to a nominal position of engagement of a motion transmission chain with a preselected toothed wheel, and in the negative case carrying out at least one of the steps of:

d) driving the primary actuation means to displace the mobile unit between the current position and the nominal position of engagement; and e) driving the secondary actuation means to displace the mobile unit between the current position and the nominal position of engagement.

Said checking step c) is carried out through at least one sensor, preferably at least one angular position sensor, more preferably of the absolute type, even more preferably at least one Hall effect encoder.

Checking step c) can be carried out cyclically at a predetermined frequency and/or after a predetermined time since gearshifting from a starting toothed wheel to said preselected toothed wheel as destination toothed wheel and/or upon request by the cyclist.

In one aspect, the invention relates to a bicycle electronic gearshift comprising at least one derailleur, preferably as described above, and a controller configured to carry out the steps of the method outlined above.

The controller can be internal to the derailleur or external to the derailleur.

The controller is made through at least one processor—typically a microprocessor or a microcontroller—being suitable for implementing one or more steps of the method, providing for suitable procedures and/or hardware modules, software and/or firmware.

In the present description and in the attached claims, therefore, under controller a logic unit shall be meant, which can however be formed of plural physical units, in particular of one or more distributed microprocessors that can be contained in one or more casings together with one or more of the other components of the bicycle gearshift.

DETAILED DISCLOSURE

The invention is shown wholly schematically in FIG. 1.

Figure 20:
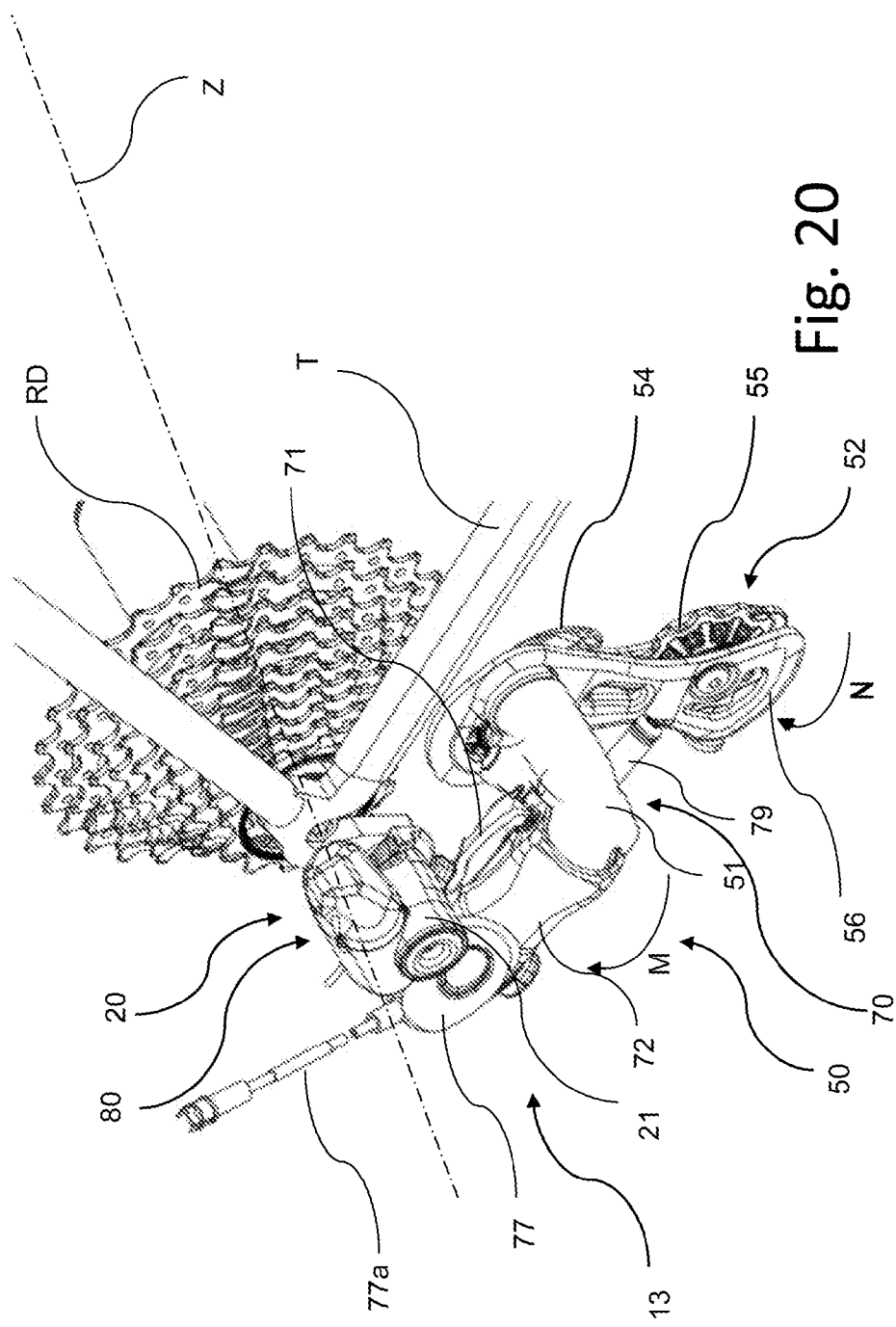
FIGS. 20-23 show a derailleur according to a first embodiment of the invention.
Figure 21:
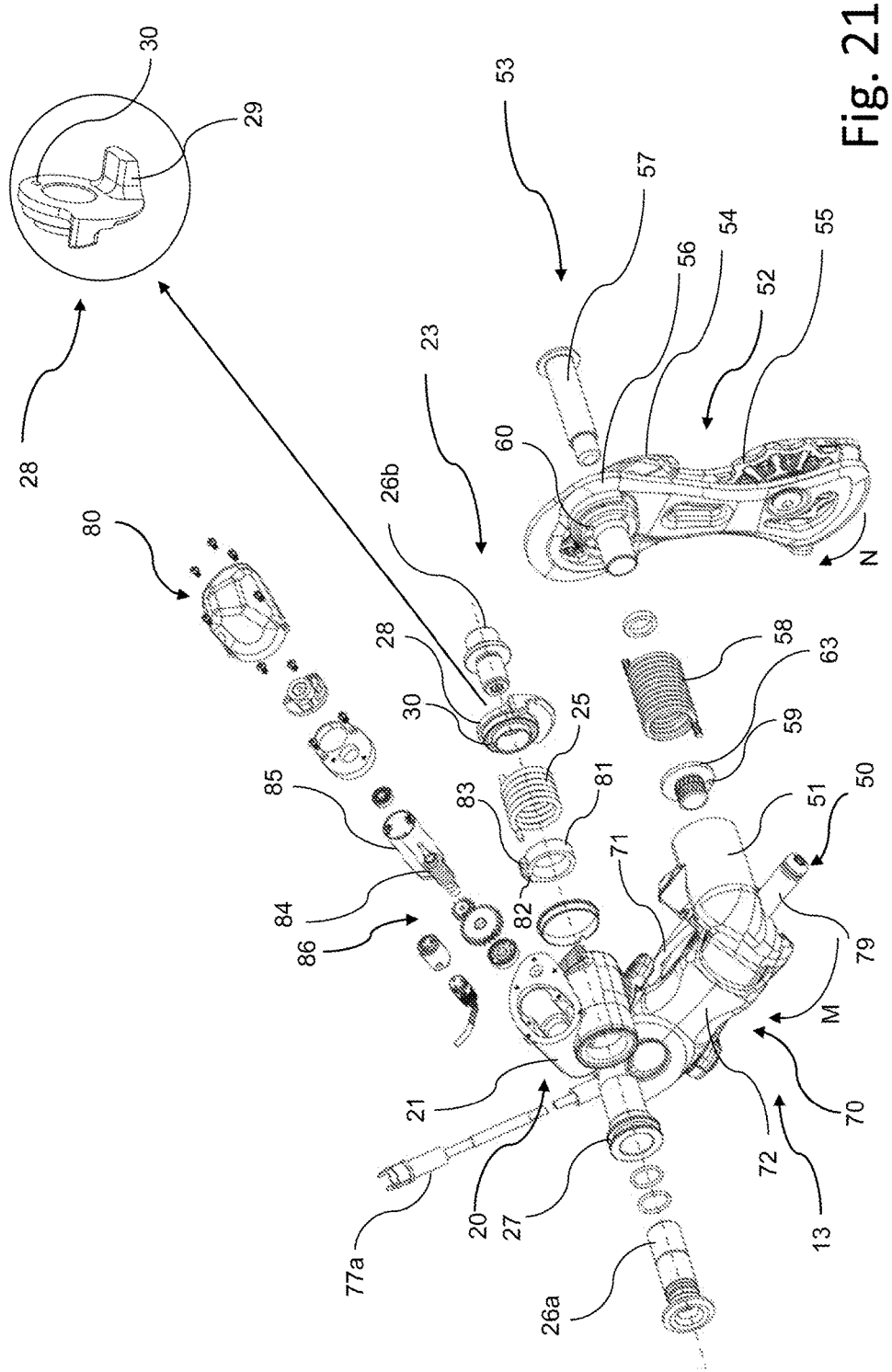
Figure 22:
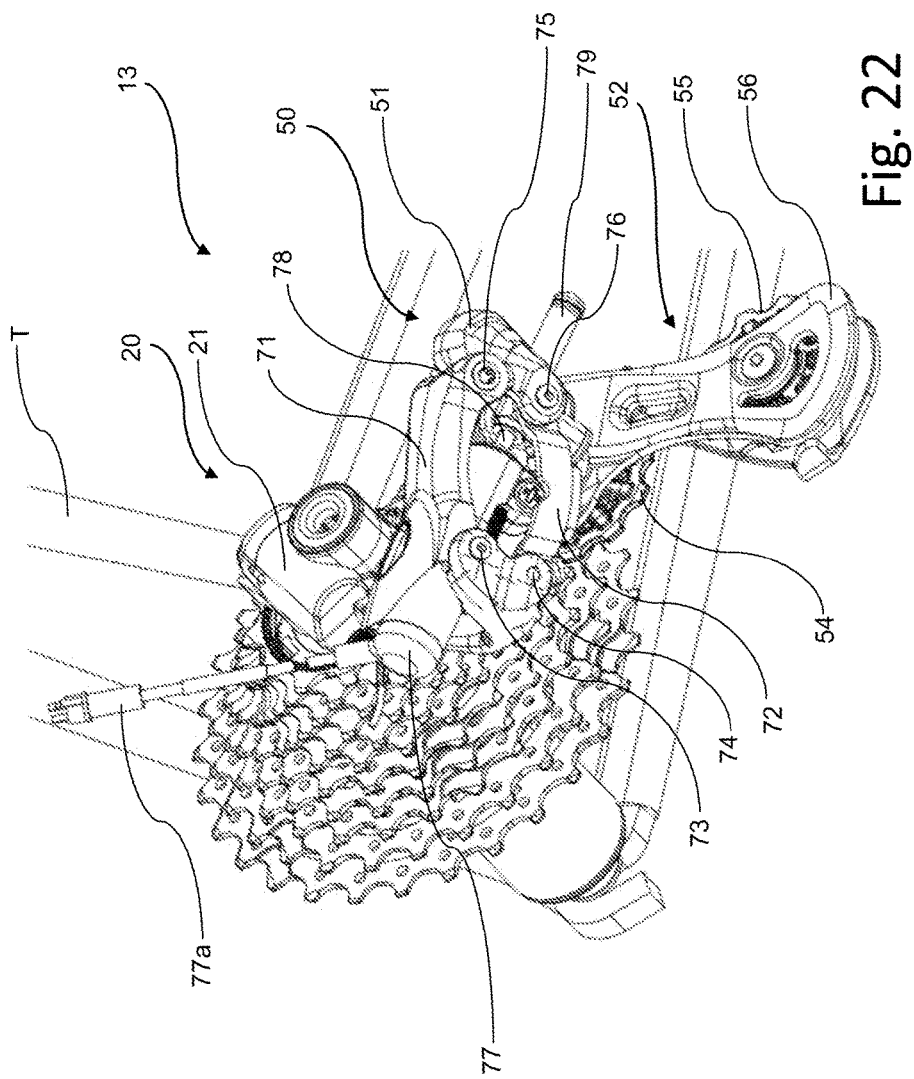
Figure 23:
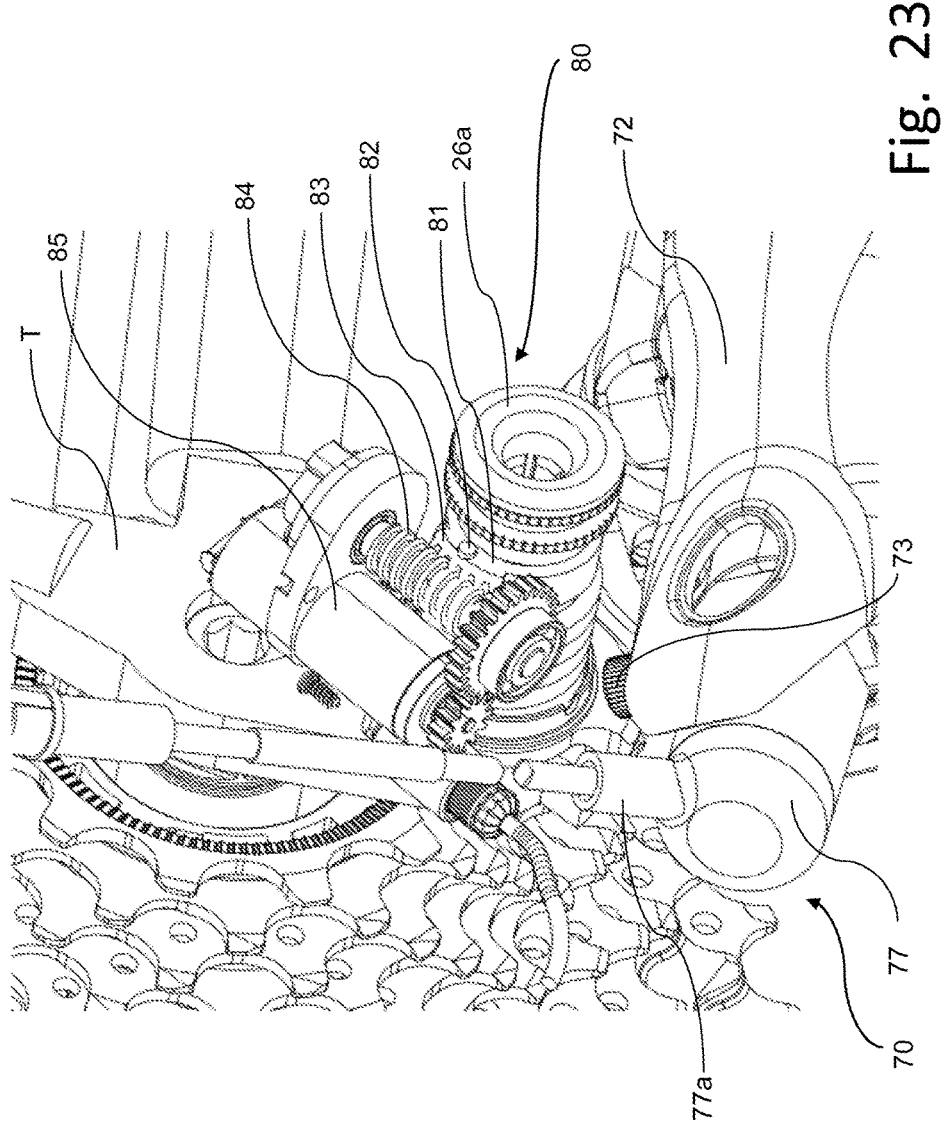
Figure 24:
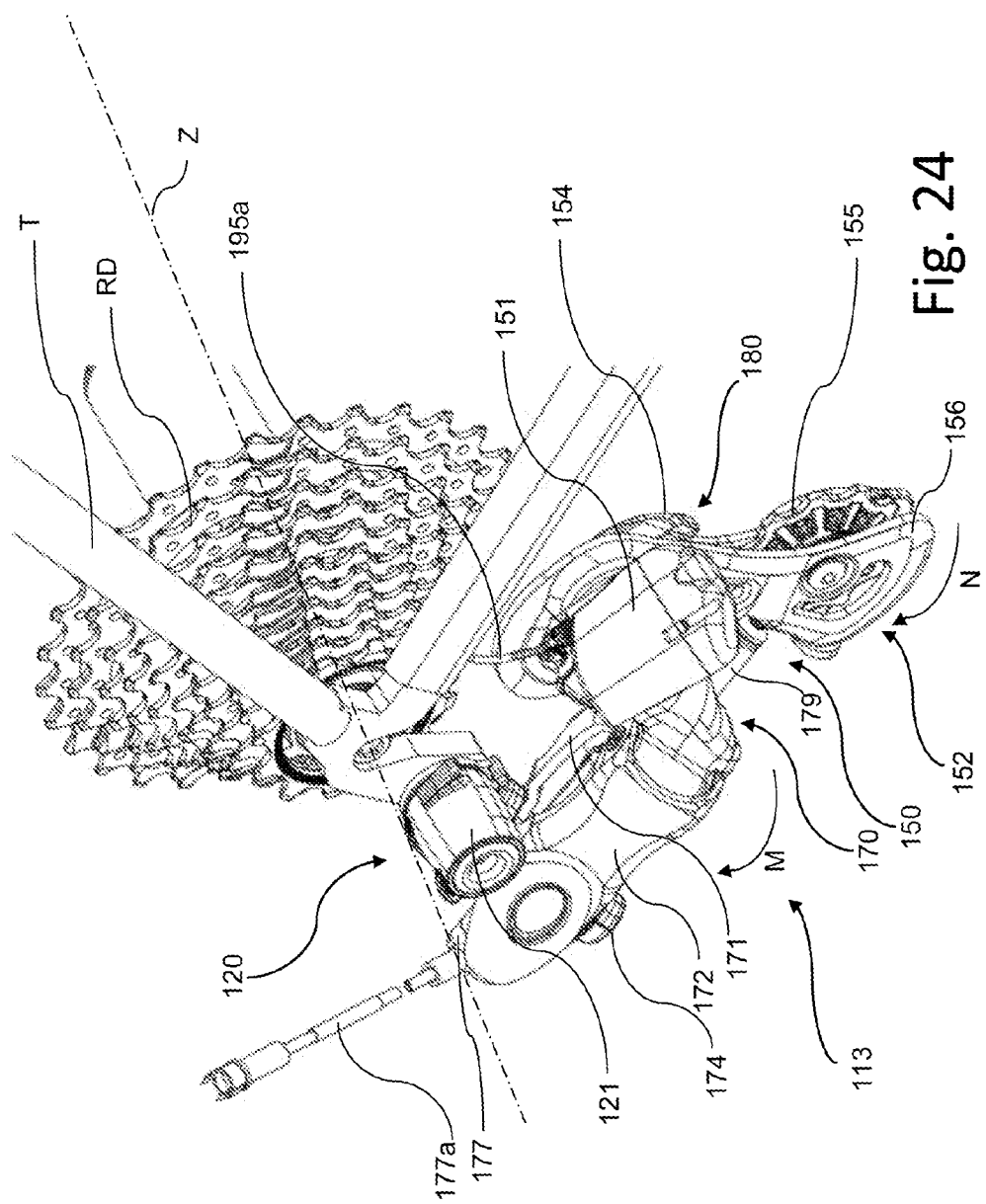
FIGS. 24-27 show a derailleur according to a second embodiment of the invention.
Figure 25:
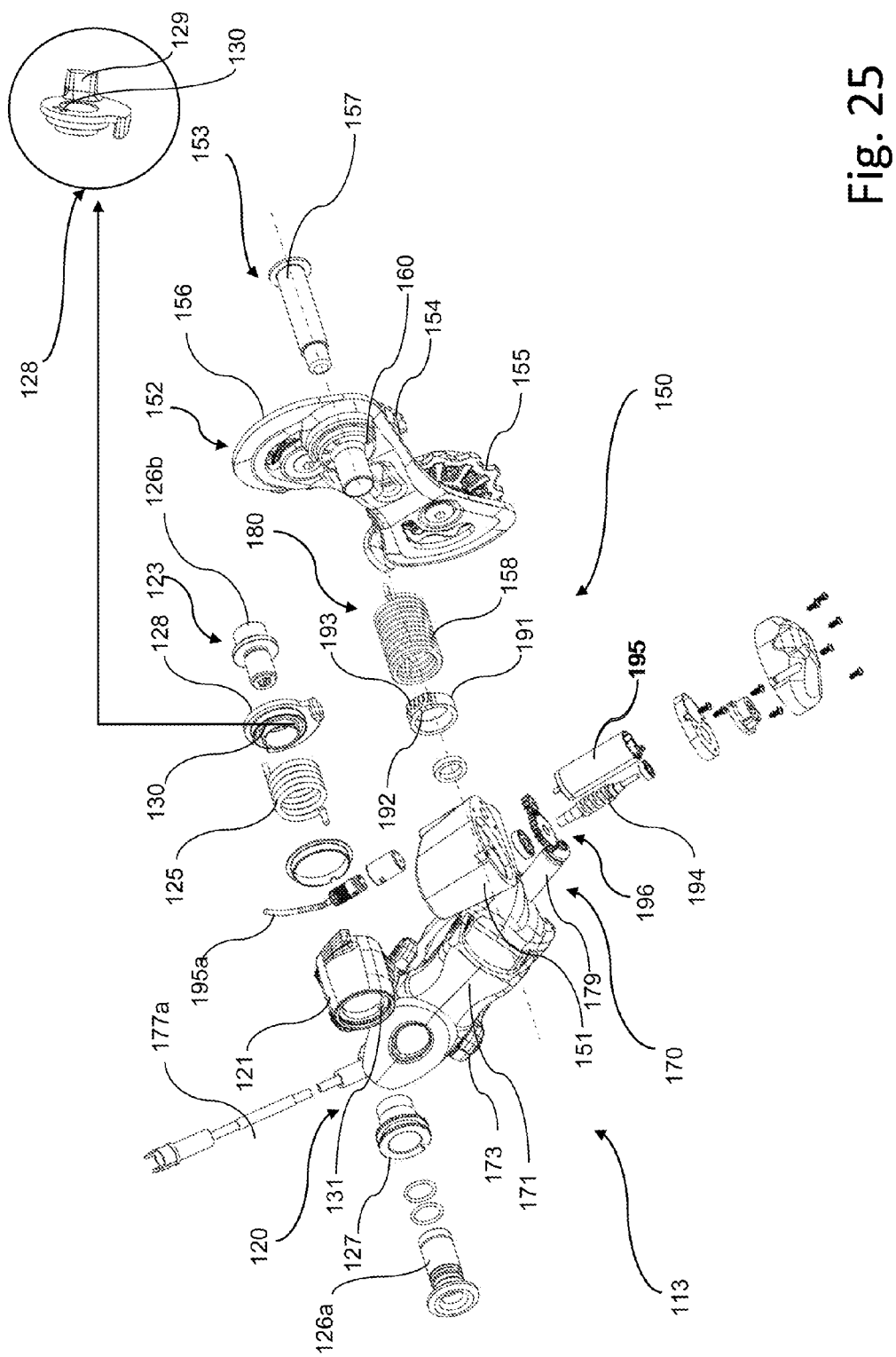
Figure 26:
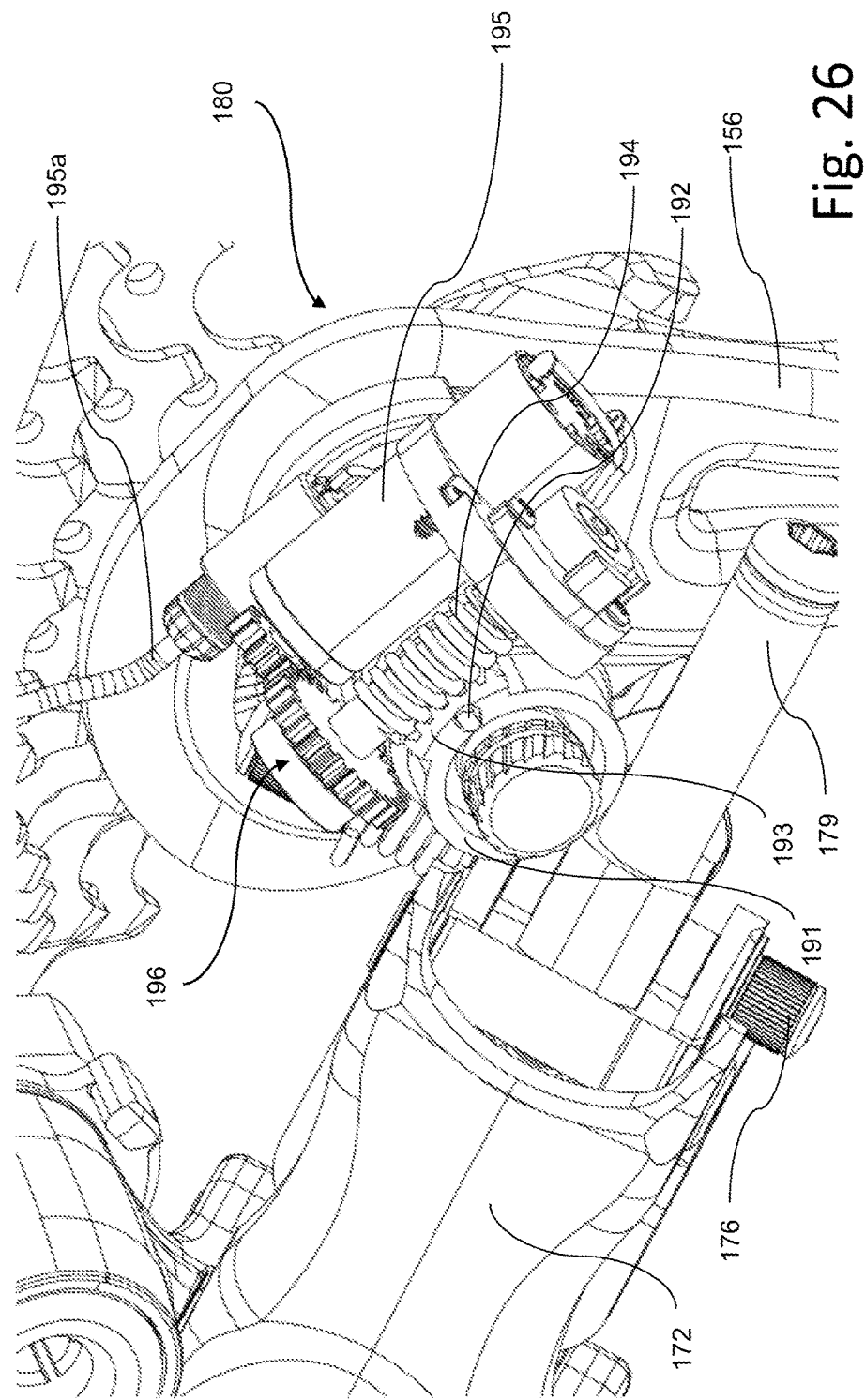
Figure 27:
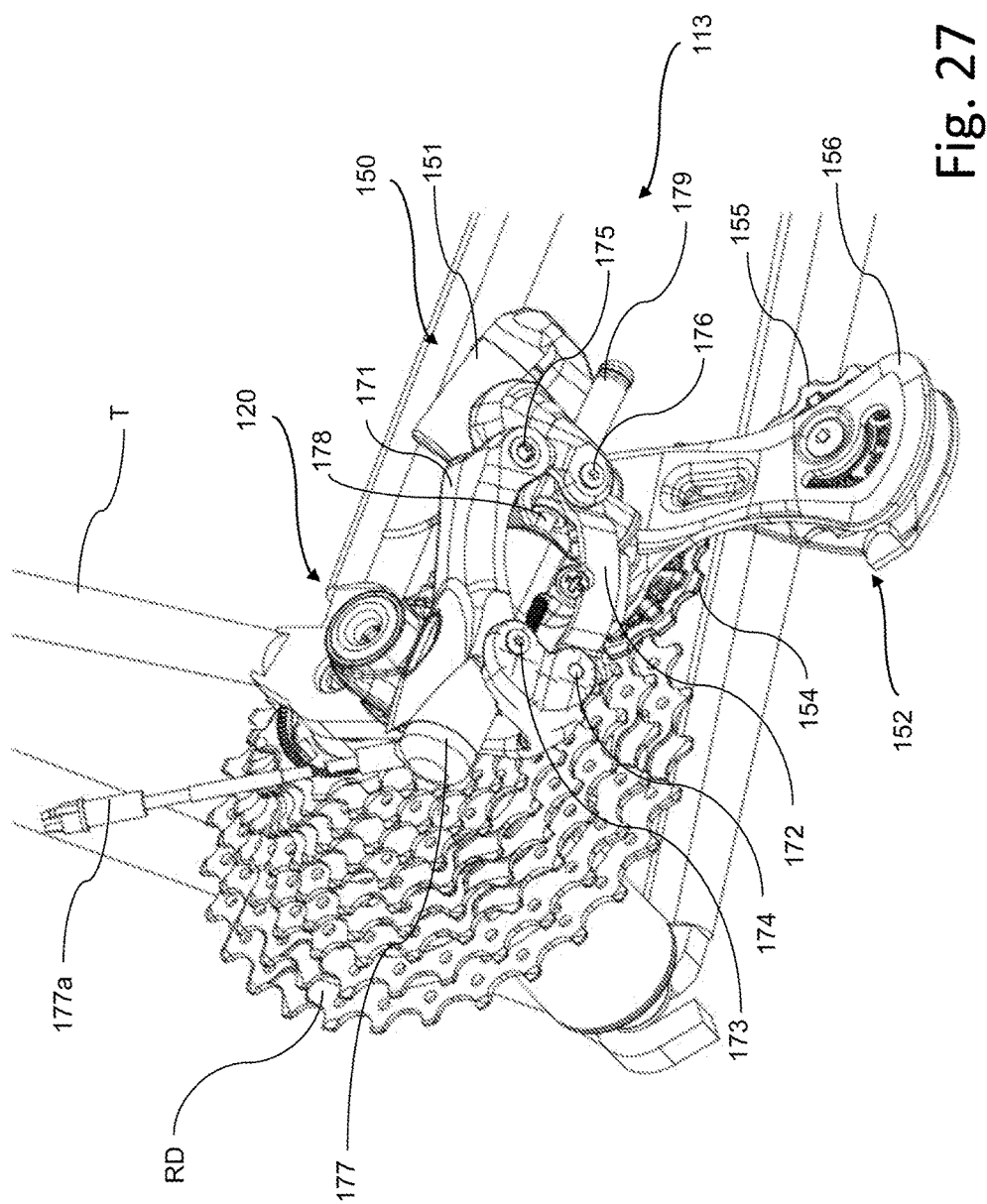
Figure 28:
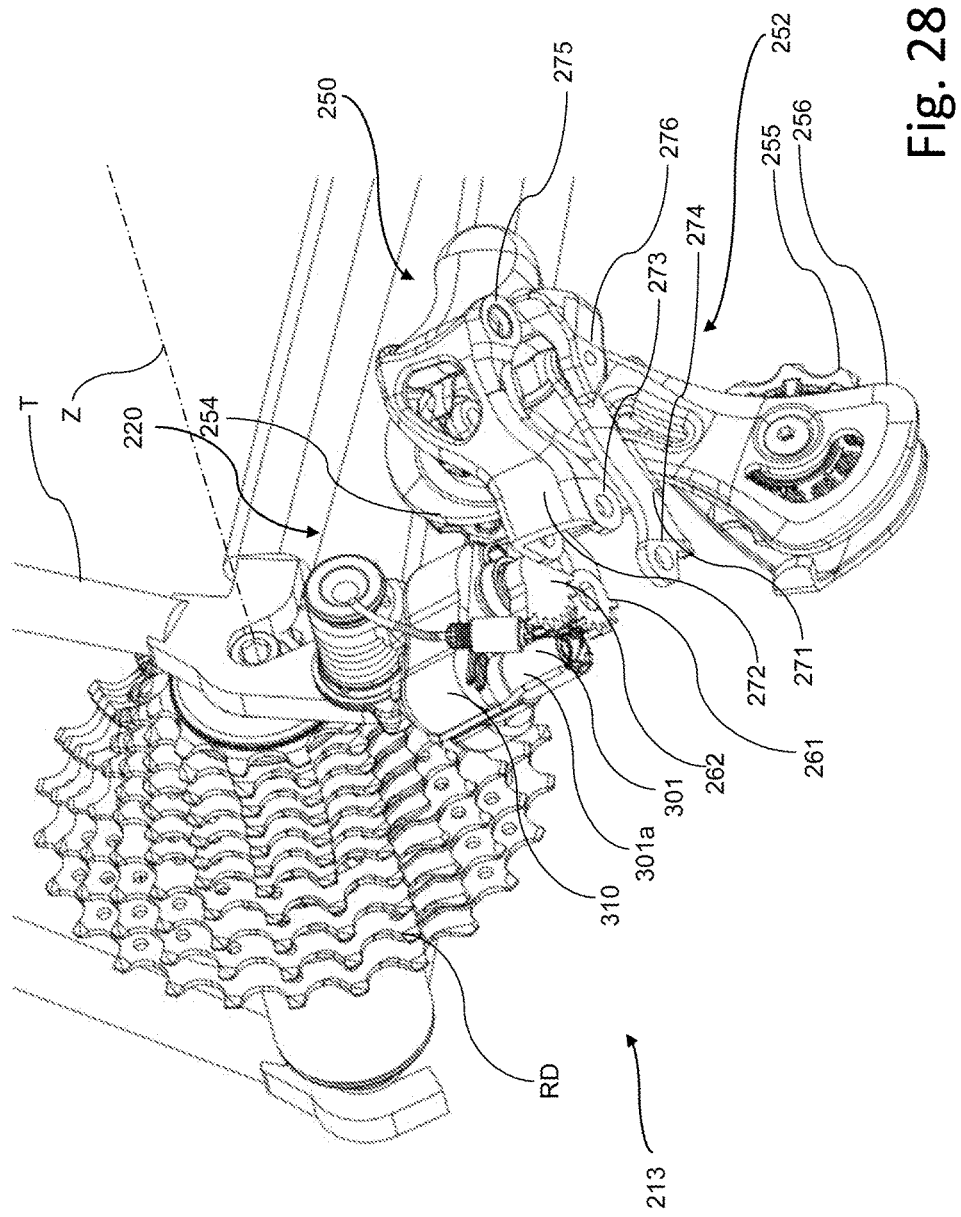
FIGS. 28-40 show a derailleur according to a third embodiment of the invention.
Figure 29:
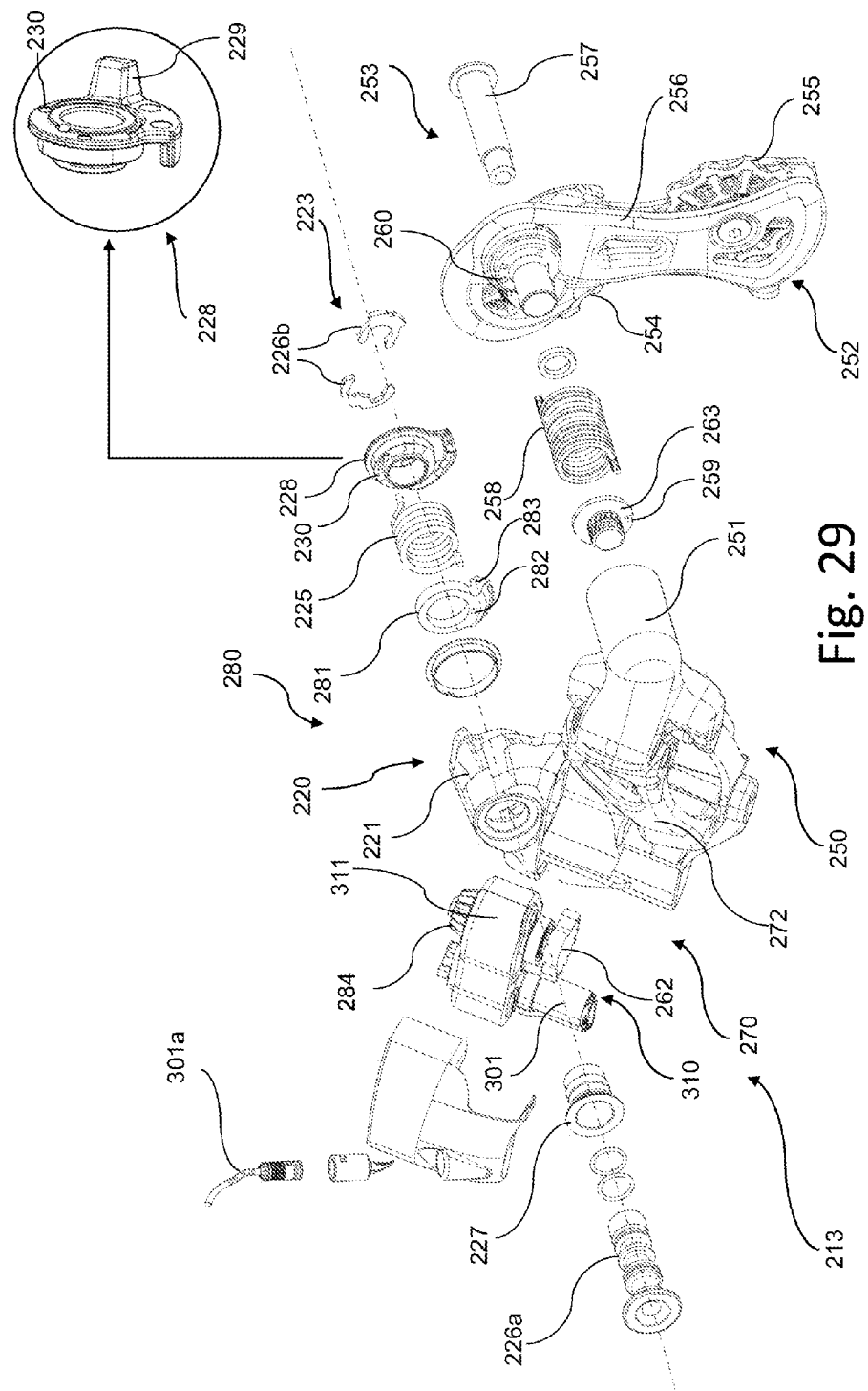
Figure 30:
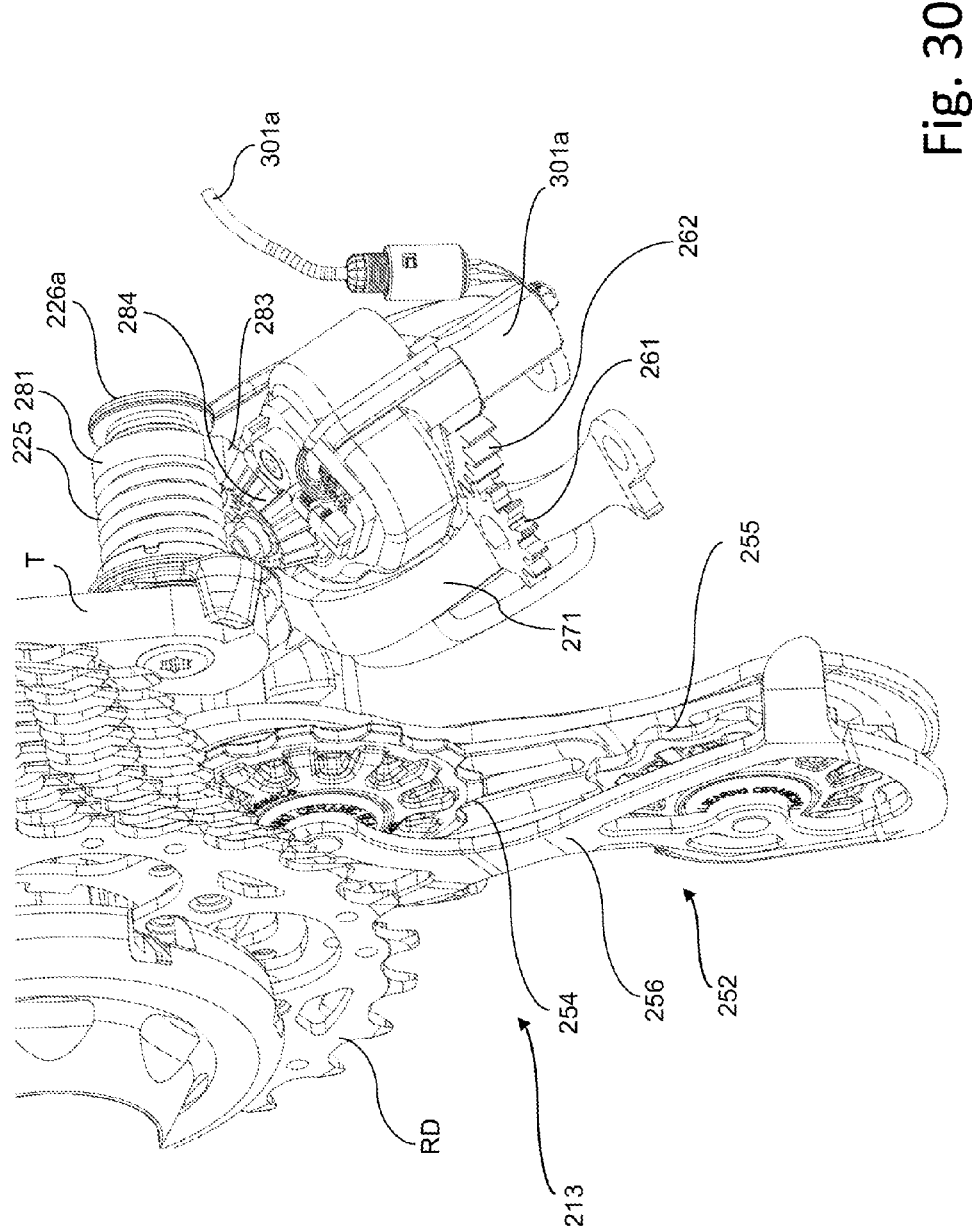
Figure 31:
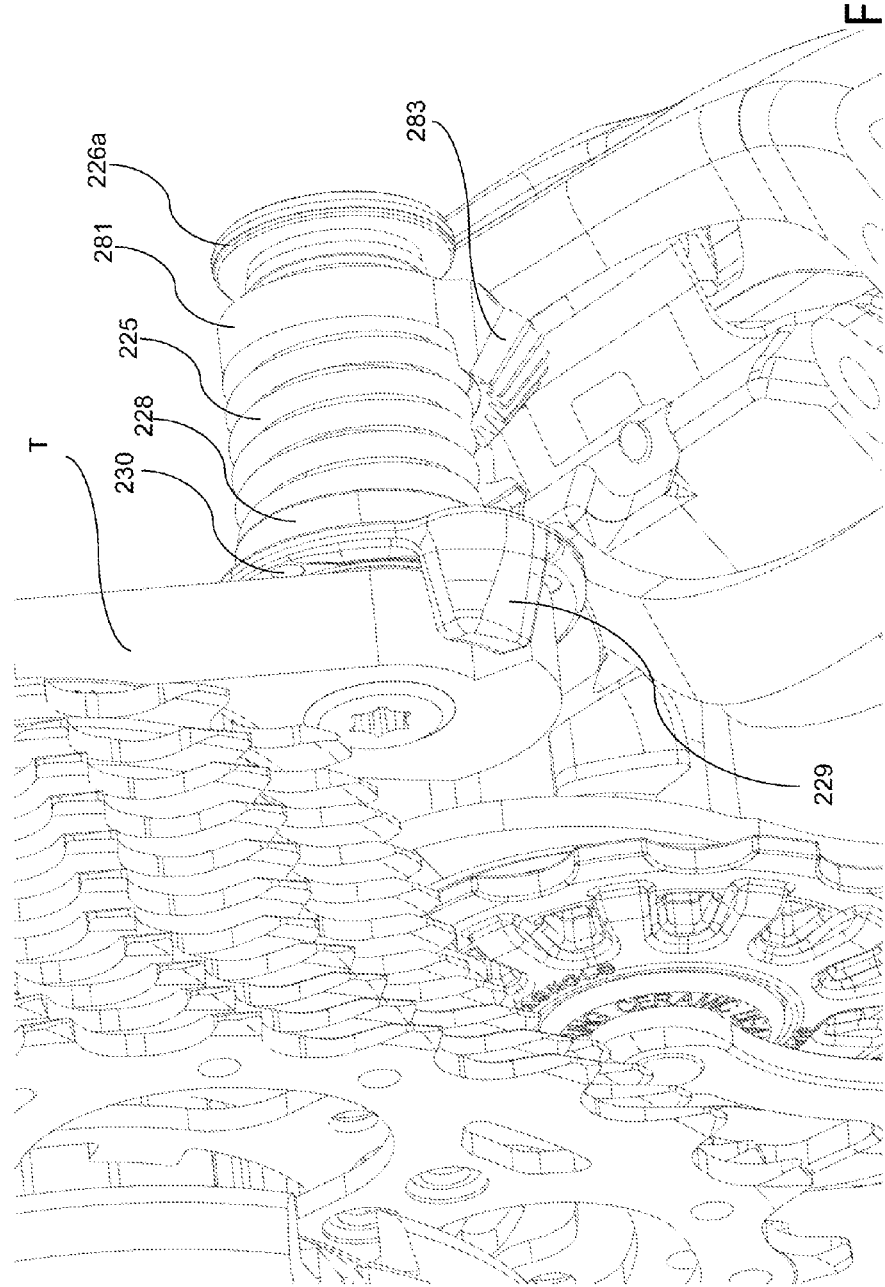
Figure 32:
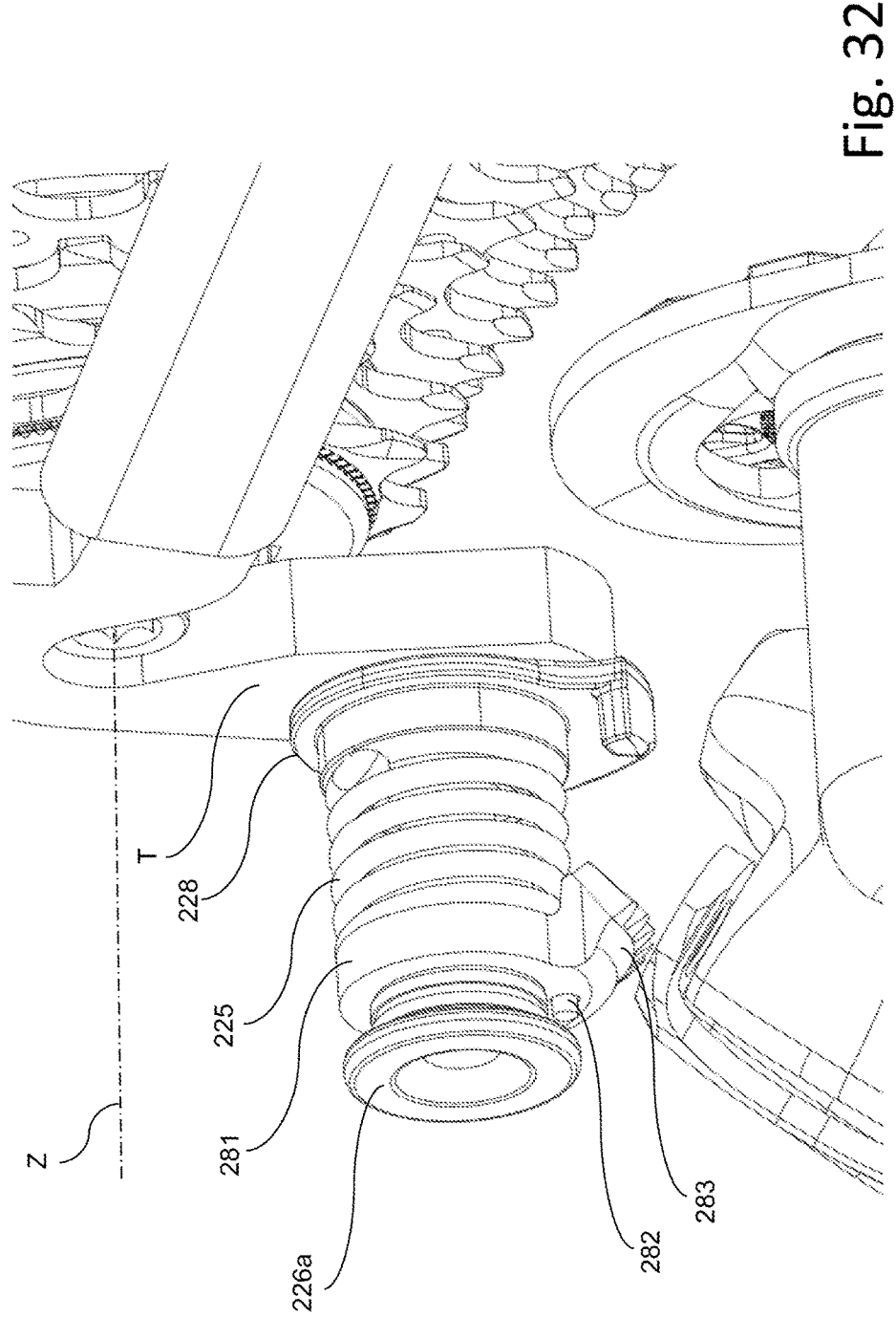
Figure 33:
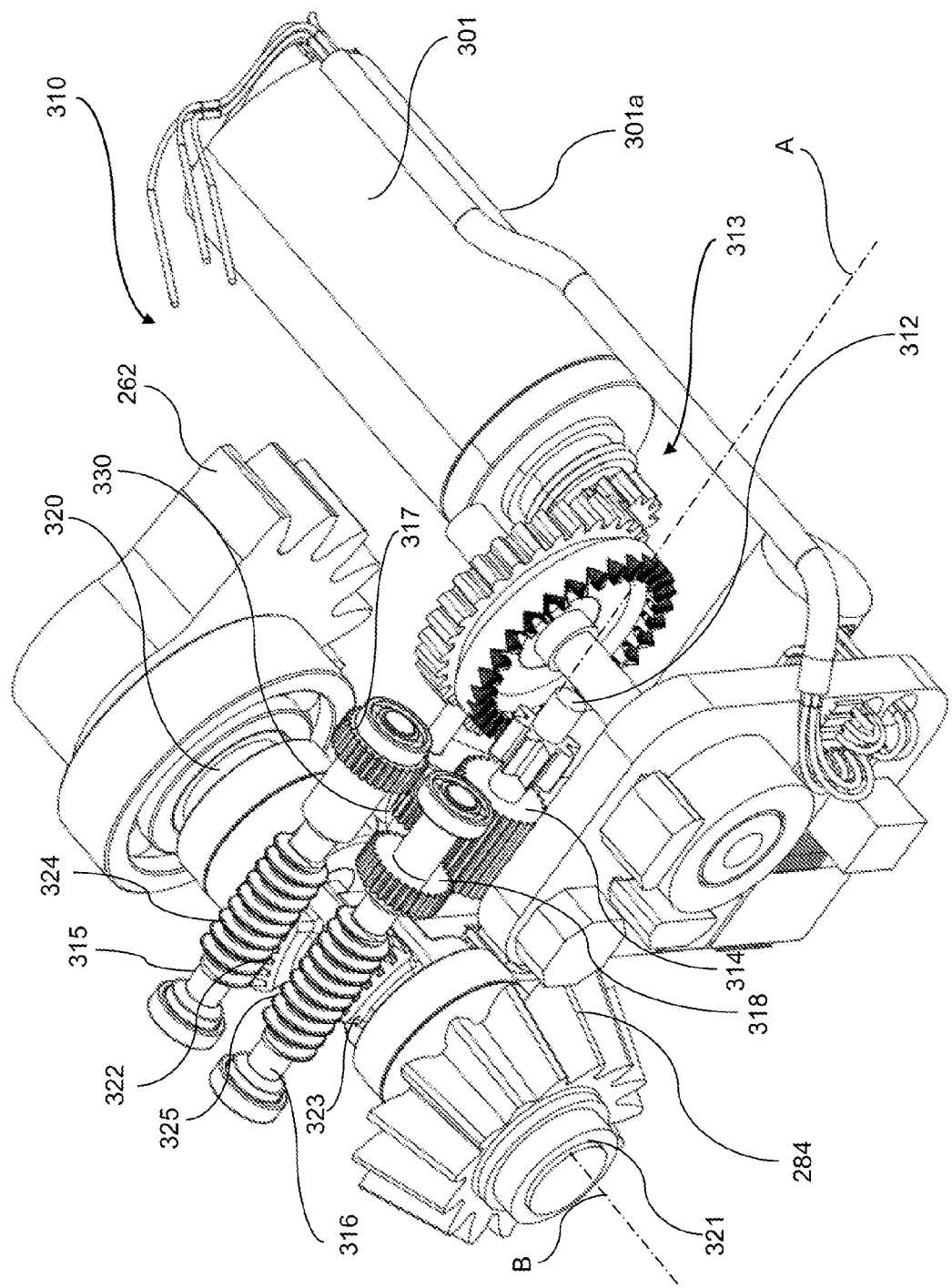
Figure 34:
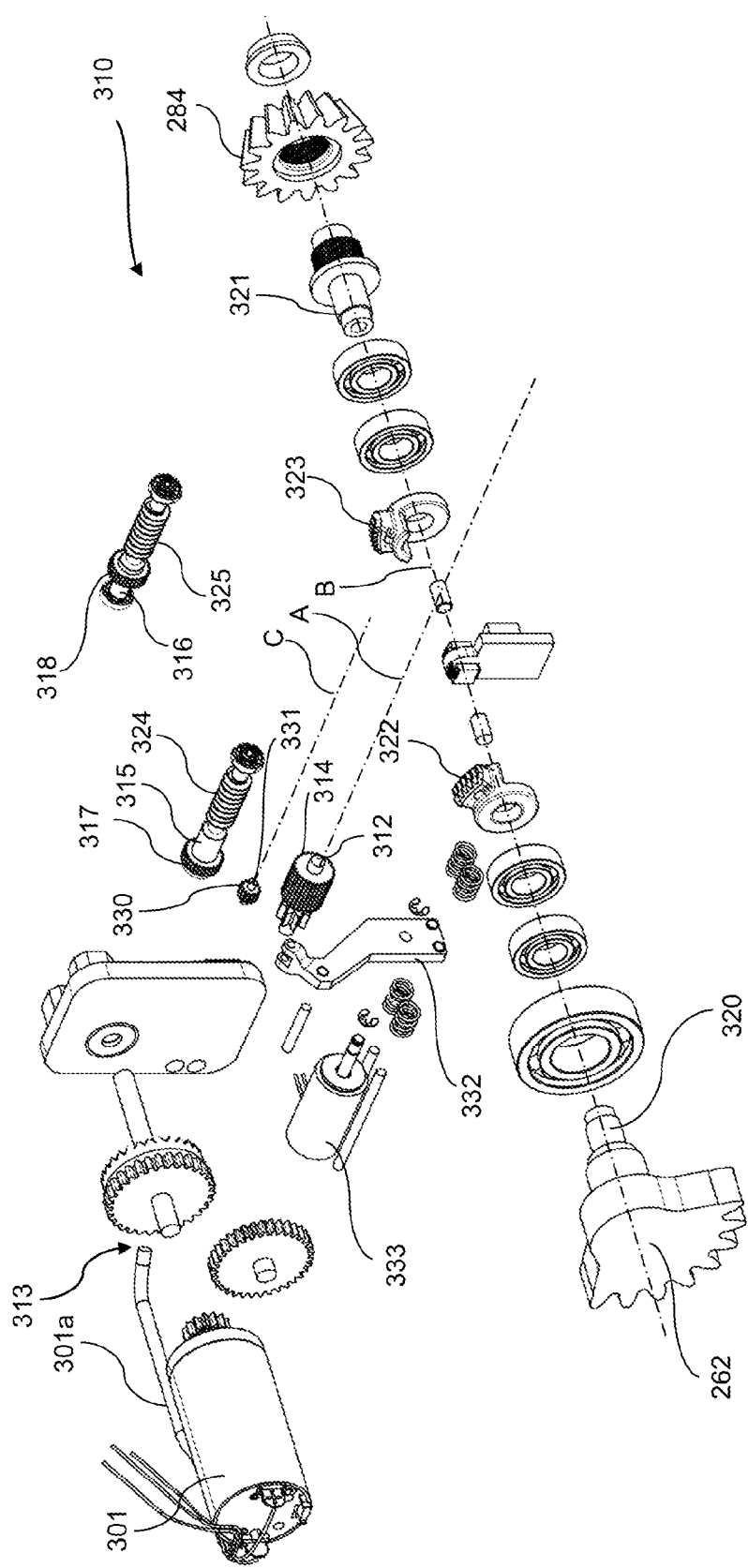
Figure 35:
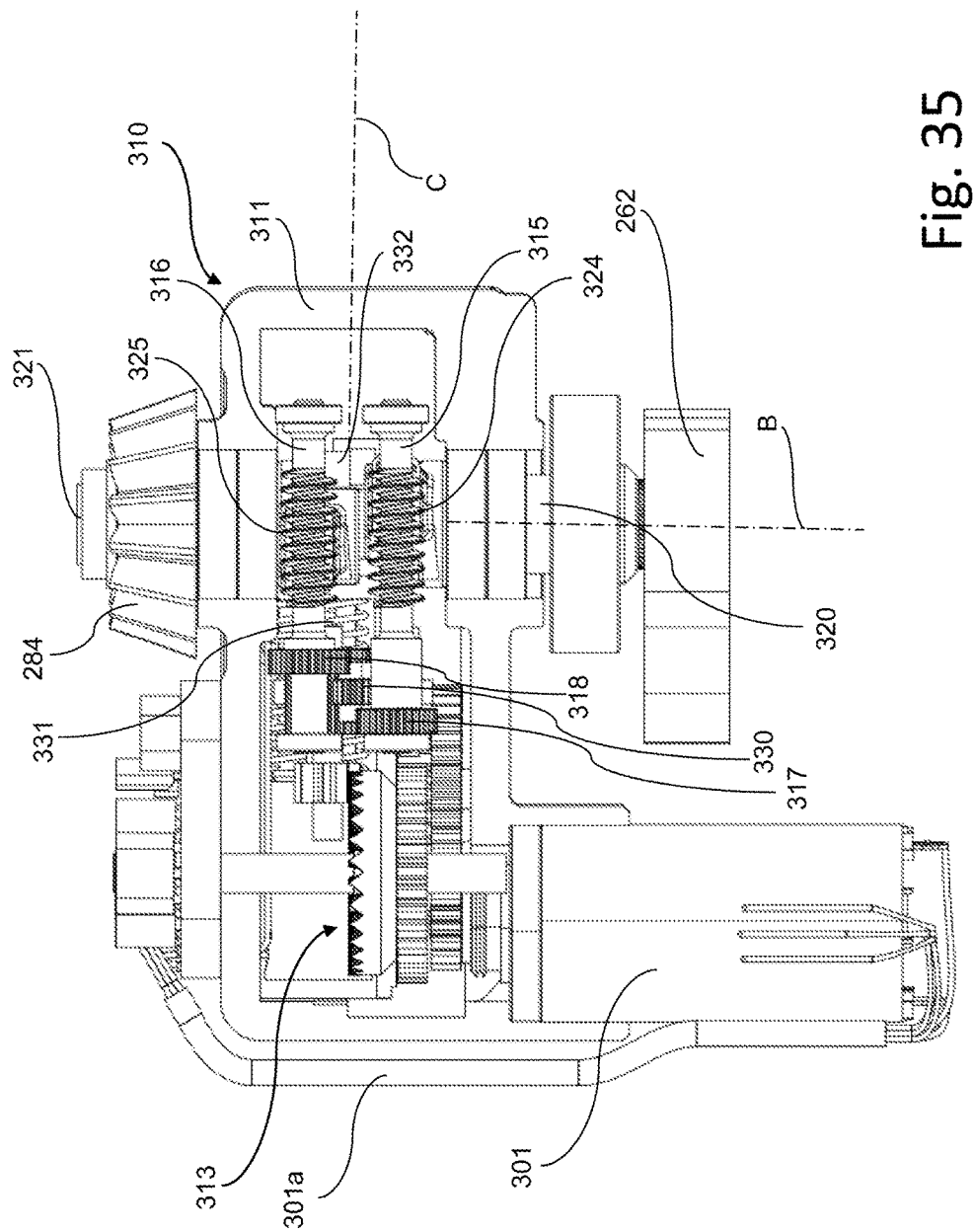
Figure 36:
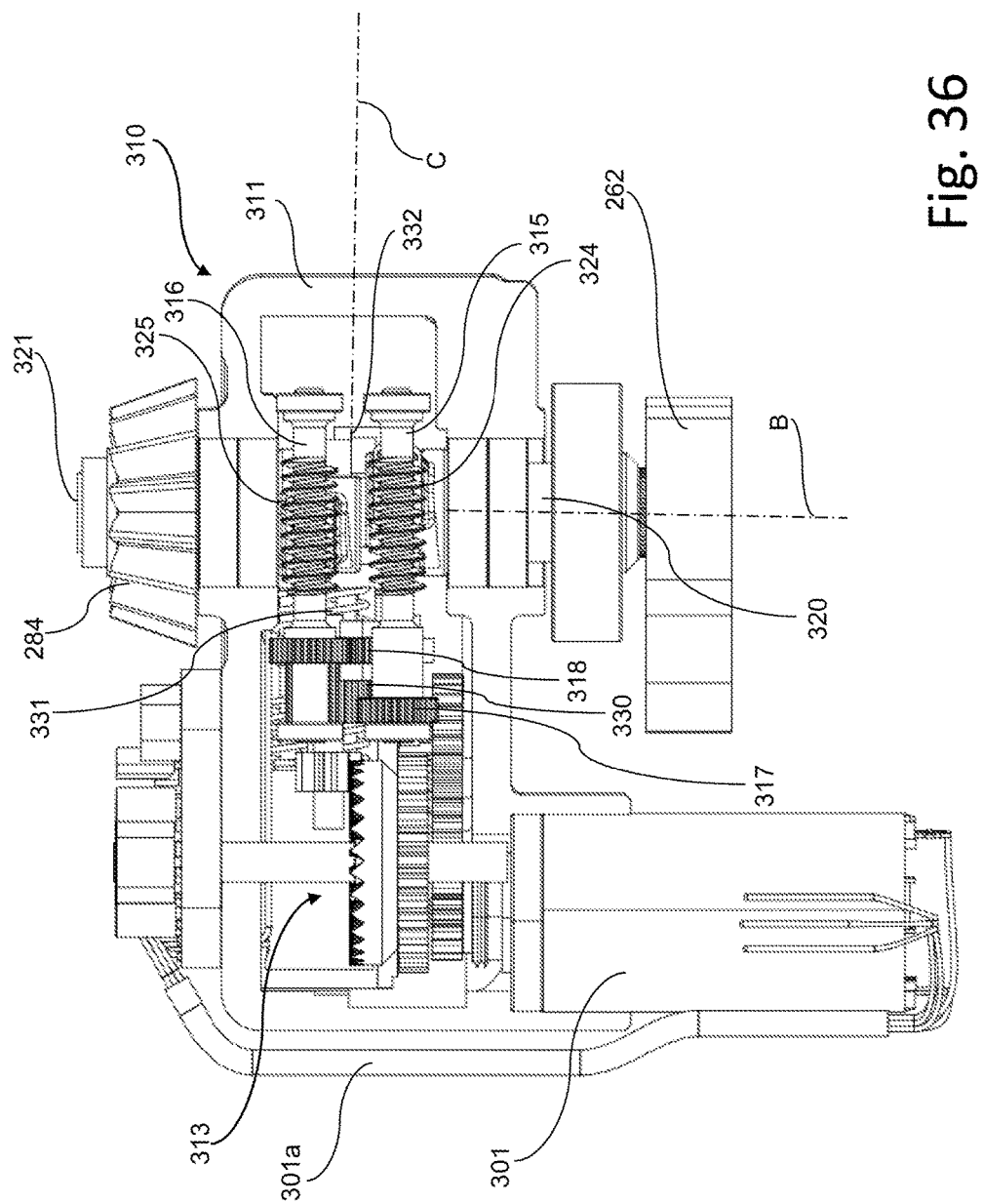
Figure 37:
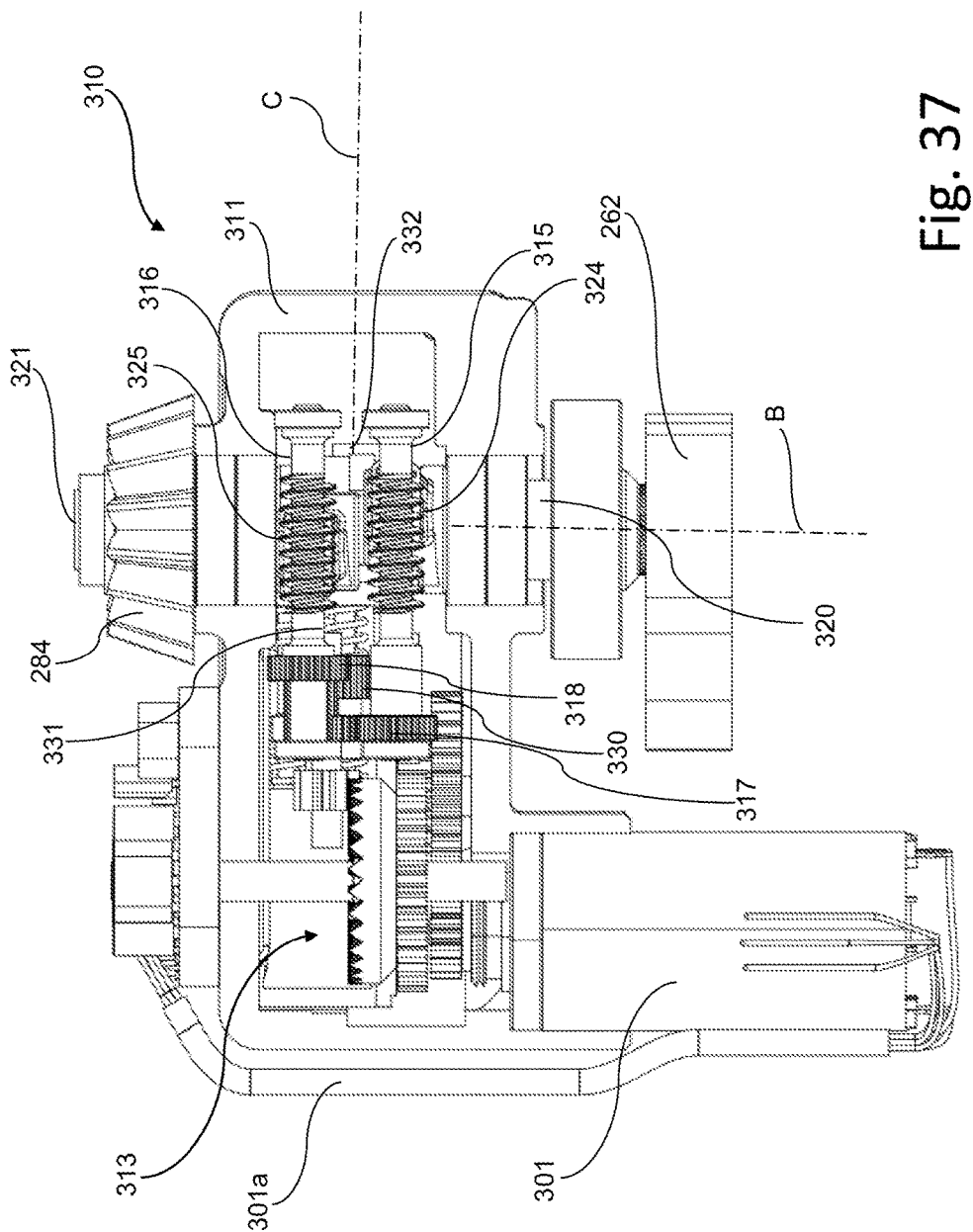
Figure 38:
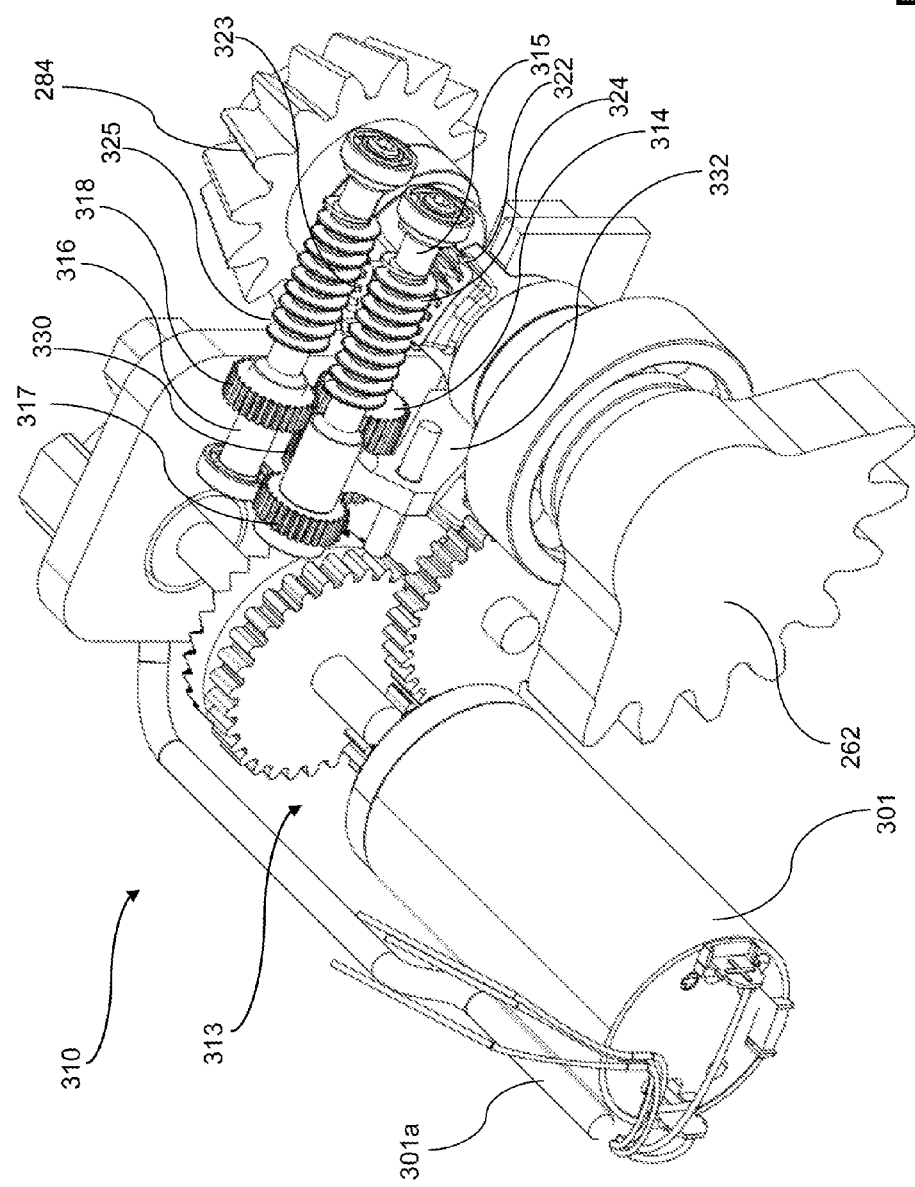
Figure 39:
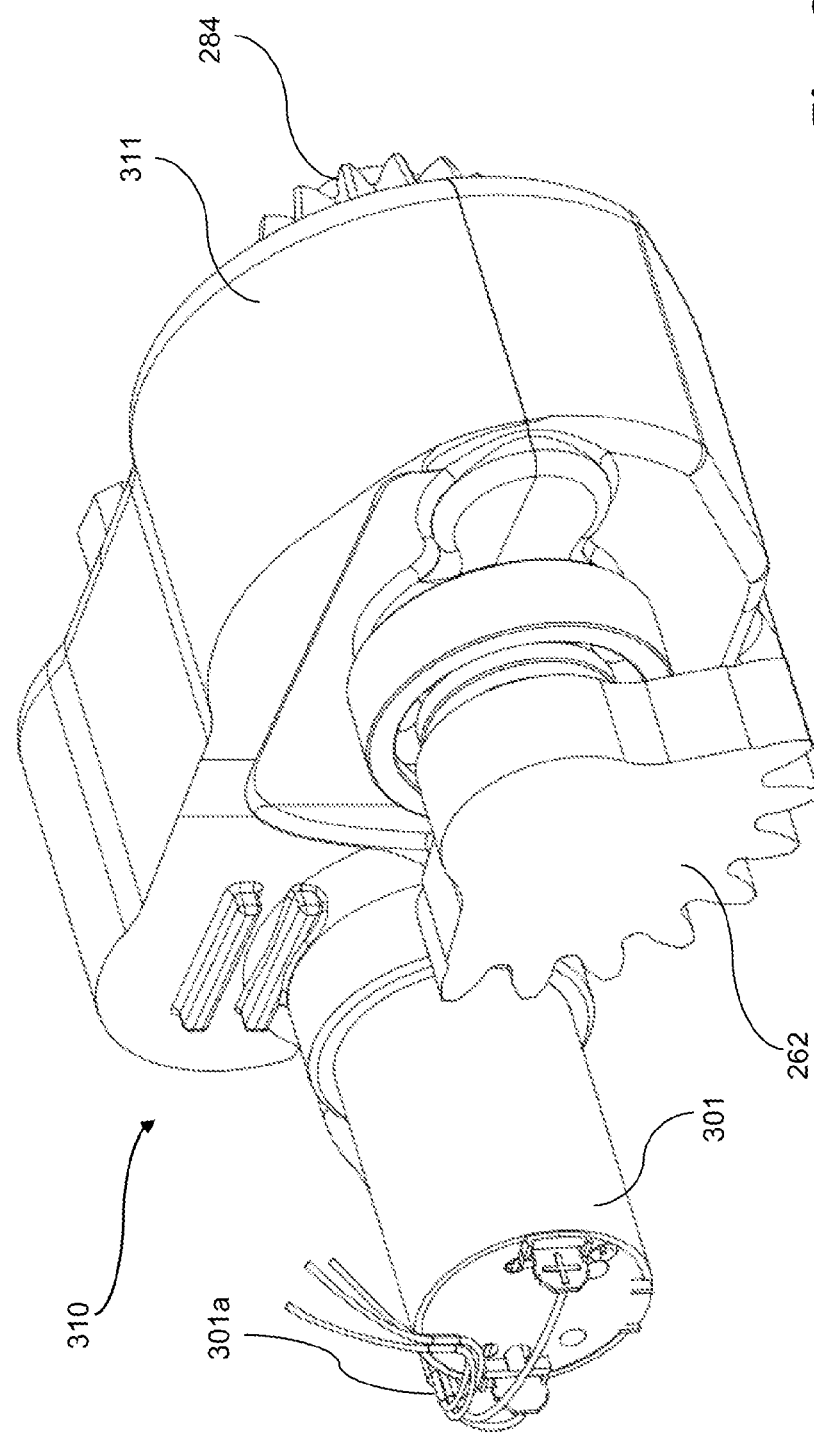
Figure 40:
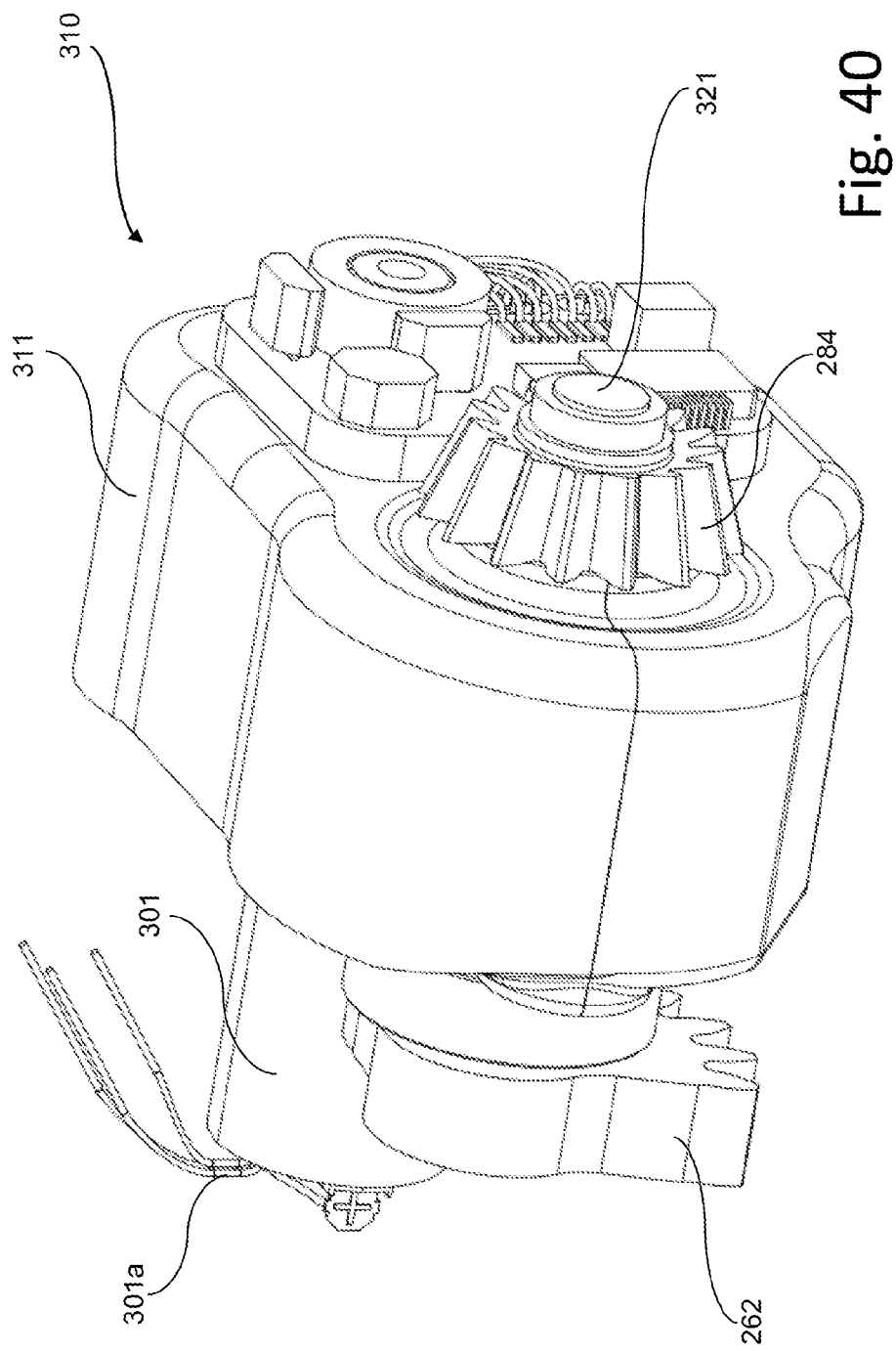

First an assembly of toothed wheels RD of the bicycle transmission is shown. The toothed wheels RD are configured to be mounted in a per se known manner on a bicycle frame T (see for example FIG. 20), typically at the axle of the pedal cranks in the front gearshift assembly or at the axle of the rear wheel in the rear gearshift assembly. The number of toothed wheels RD shown is merely an example.

The toothed wheels RD are coaxial to each other, the axis of the assembly of toothed wheels RD being indicated with Z. The toothed wheels RD have a different diameter, and in particular decreasing from left to right in FIG. 1, however this is not strictly necessary. The toothed wheels RD have a distance along the axis Z, also known as pitch, that is constant, but this is not strictly necessary.

A chain (not shown) of the transmission is in engagement with one toothed wheel RD at a time during travel, according to the desired gear ratio—said gear ratio being given by the number of teeth and therefore by the diameter of the engaged toothed wheel RD, as well as in general by the number of teeth and therefore by the diameter of the engaged toothed wheel in a second assembly of toothed wheels of the transmission.

A gearshift 1 allows the gear ratio to be changed by displacing the chain among the toothed wheels RD. Through gearshifting, the chain is taken from engagement with a starting toothed wheel RD to engagement with a destination toothed wheel RD, and it can turn out to be temporarily engaged with two adjacent toothed wheels RD during gearshifting.

The gearshift 1 comprises a derailleur 2 associated with the assembly of toothed wheels RD—and a possible second derailleur (not shown) associated with the second assembly of toothed wheels of the transmission.

The derailleur 2 comprises a support unit 3, configured to be mounted, in a fixed and per se known manner, on the frame T at the assembly of toothed wheels RD.

The derailleur 2 further comprises a mobile unit 4, which is so mounted as to be mobile with respect to the support unit 3, and therefore mobile with respect to the frame T, and in particular mobile with respect to the assembly of toothed wheels RD.

The mobile unit 4 comprises a chain guide (not shown in FIG. 1) that determines the position of the chain with respect to the assembly of toothed wheels RD and therefore the toothed wheel RD with which the chain is in engagement.

The derailleur 2 further comprises primary actuation means 5 configured to move the mobile unit 4 with respect to the support unit 3 so as to impart thereon, and therefore to impart on the chain guide and eventually on the chain, a primary displacement in the axial direction with respect to the axis Z of the assembly of toothed wheels RD, namely along the axis Z. In the following description, reference will sometimes be made to the position and to the displacement of the mobile unit 4 with respect to the toothed wheels RD, sometimes to the position and to the displacement of the chain guide with respect to the axis Z, sometimes to other parts.

The primary displacement of the mobile unit 4 is shown schematically by the double arrow between an example starting position of the mobile unit 4, shown with a solid line, and an example destination position of the mobile unit 4, shown with a dashed line and indicated as 4a.

More in general, the primary displacement of the mobile unit 4 can have, besides the component in the axial direction, also a component in the radial direction and/or a component in the circumferential direction, namely it rotates around the toothed wheels RD. In other words, the primary displacement of the mobile unit 4 can have components also along the axes X and Y shown in FIG. 1.

The derailleur 2 further comprises secondary actuation means 6 configured to move the mobile unit 4 with respect to the support unit 3 so as to impart onto the chain guide, and eventually onto the chain, a secondary displacement in the radial direction with respect to the axis Z of the assembly of toothed wheels RD, namely closer to or farther from the axis Z and therefore to/from the circumference of the toothed wheels RD.

The secondary displacement of the mobile unit 4 is shown schematically by the double arrow between the example starting position of the mobile unit 4, shown with a solid line, and an example destination position of the mobile unit 4, shown with a chain dotted line and indicated as 4b.

The secondary displacement imparted by the secondary actuation means 6 can also have a possible component in the circumferential direction, but it does not have any component in the axial direction Z.

According to the invention, the secondary actuation means 6 are capable of moving the mobile unit 4 independently of the primary actuation means 5.

Through a suitable choice among the primary displacement imparted by the primary actuation means 5 and the secondary displacement imparted by the secondary actuation means 6, or a suitable combination thereof, the mobile unit 4 can be brought at any moment into virtually any position with respect to the assembly of toothed wheels RD.

Those skilled in the art will understand, in light of the following description, that the primary displacement of the mobile unit 4 will be limited to a stroke extending between the two extreme toothed wheels RD of the assembly, or slightly beyond. The secondary displacement of the mobile unit 4 will be limited to a stroke extending between a position in close proximity to the circumference of the toothed wheel RD having the minimum diameter, and a position relatively far from the circumference of the toothed wheel RD having maximum diameter, still sufficiently close to keep the chain in engagement with such a toothed wheel RD having maximum diameter, and thus prevent the chain from falling.

In an electronically servo-assisted embodiment of the gearshift 1, the primary actuation means 5 and the secondary actuation means 6 are driven, independently—even if coordinately—by a controller 7 of the bicycle gearshift 1.

The controller 7 is embodied by at least one processor—typically a microprocessor or a microcontroller—suitable for implementing one or more of the steps described herein, providing for suitable procedures and/or hardware, software and/or firmware modules.

In the present description and in the attached claims, therefore, under controller 7 a logic unit is meant, which can however be formed of plural physical units, in particular of one or more distributed microprocessors that can be contained in one or more casings together with one or more of the other components of the bicycle gearshift.

The controller 7 can thus be internal to the derailleur 2 or external to the derailleur 2, or partially internal and partially external thereto.

Figure 2:
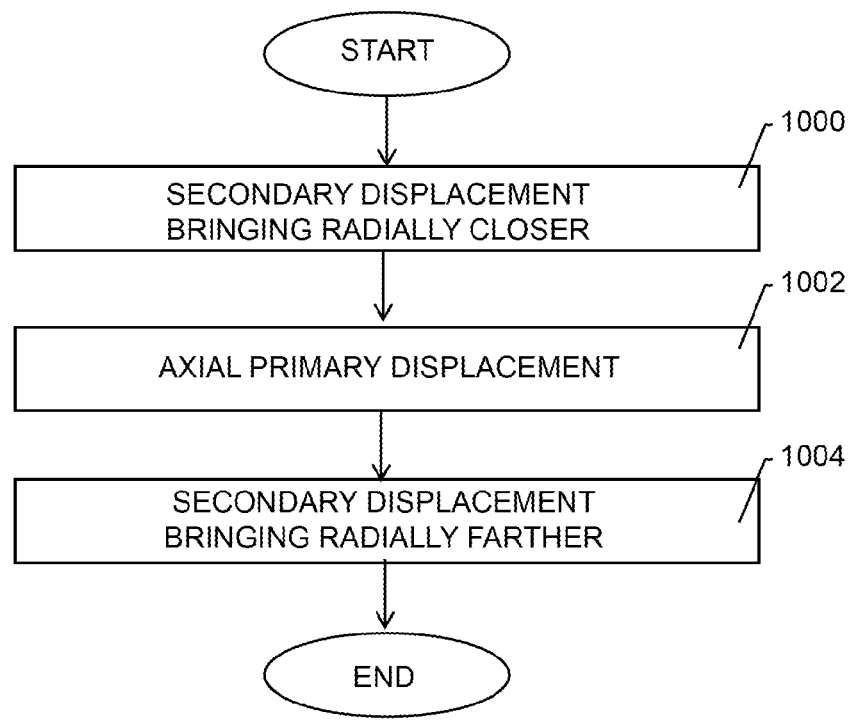
FIG. 2 is a block diagram relating to a first gearshifting mode according to the invention.

With reference to FIG. 2, a first gearshifting mode according to the invention is shown. The gearshifting mode shown in FIG. 2 is particularly suitable for implementation in a derailleur of the type shown in FIGS. 28-40 described hereinafter, wherein the primary actuation means 5 and the secondary actuation means 6 share a single electric motor, however it can also be implemented in a derailleur of the type shown in FIGS. 20-23 and in FIGS. 24-27 described hereinafter, wherein the primary actuation means 5 and the secondary actuation means 6 have a respective electric motor.

In a step 1000, the controller 7 drives the secondary actuation means 6 to bring the mobile unit 4 radially closer to the support unit 3, and therefore to the assembly of toothed wheels RD.

Figure 3:
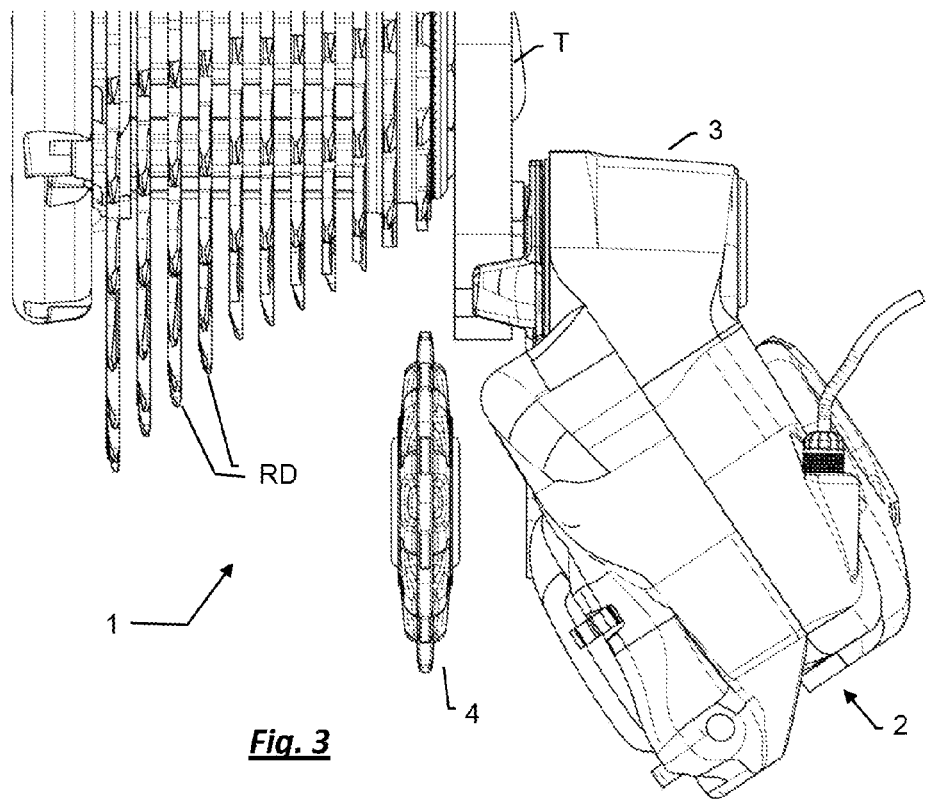
FIGS. 3-7 are diagrammatic views of a sequence of positions of the derailleur during upward gearshifting carried out with such a mode.
Figure 4:
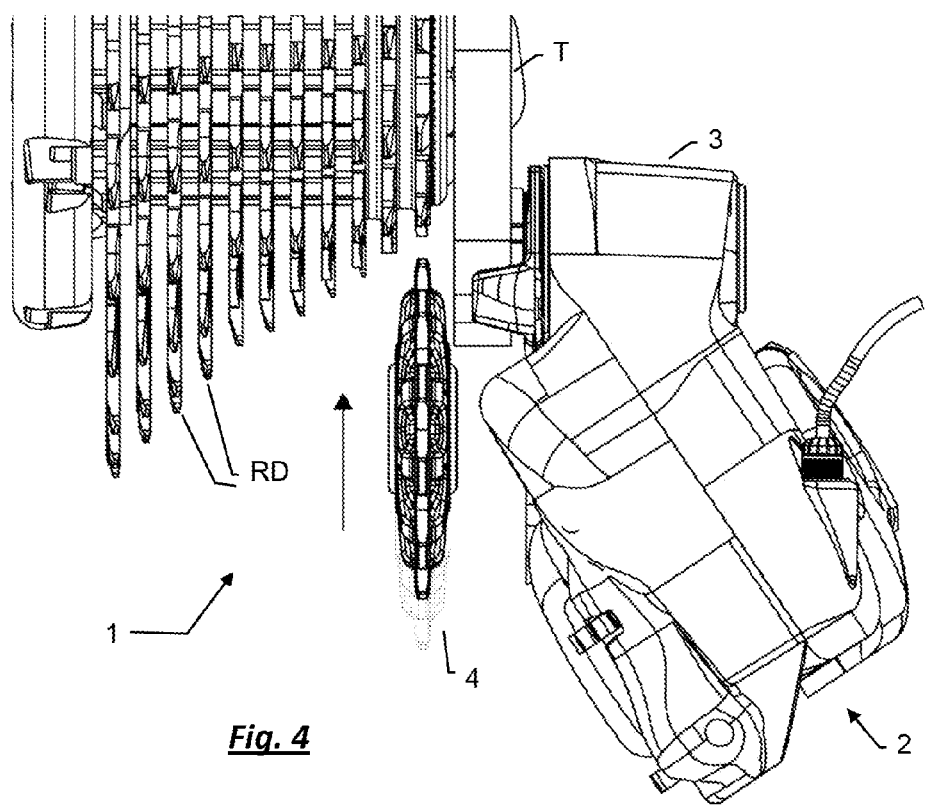
Figure 8:
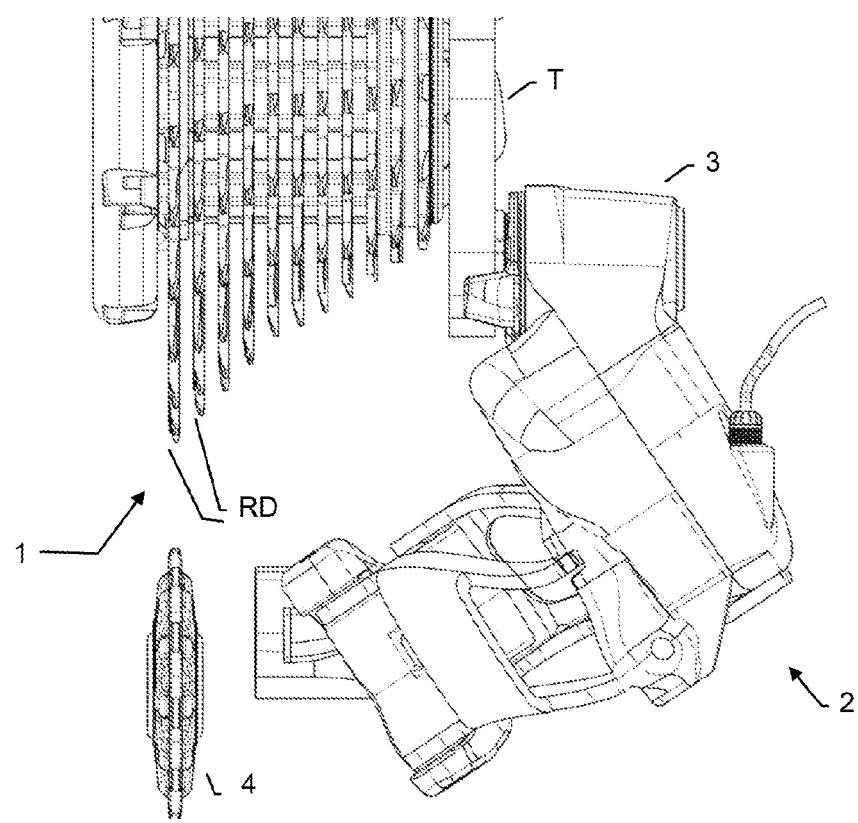
FIGS. 8-12 are diagrammatic views of a sequence of positions of the derailleur during downward gearshifting carried out with such a mode.
Figure 9:
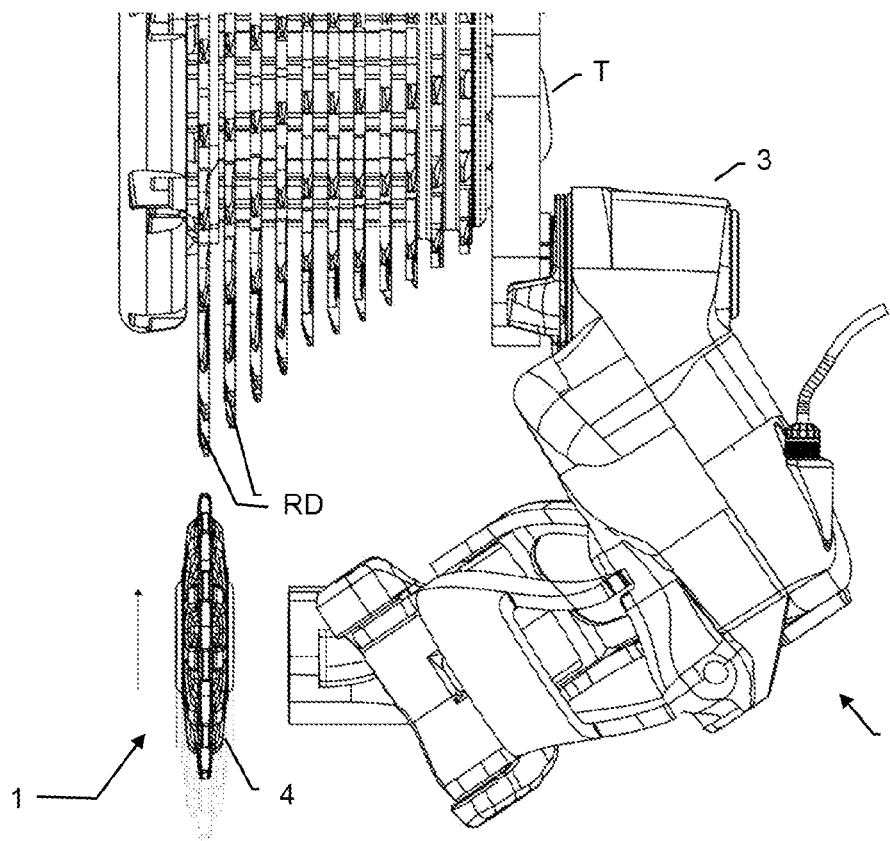

In particular, in this step 1000 the mobile unit 4 starts from a position (FIG. 3 for the case of upward gearshifting, and FIG. 8 for the case of downward gearshifting) wherein it is relatively radially far from a starting toothed wheel RD, with which the chain is engaged, and is brought (FIG. 4 and FIG. 9) into a position wherein it is relatively radially close to the starting toothed wheel RD.

The initial position (FIG. 3 and FIG. 8) of step 1000, relatively far, is such that the chain is not unduly stressed, and therefore normal travel occurs as smoothly as possible. The final position (FIG. 4 and FIG. 9) of step 1000, relatively close, is such as to facilitate the engagement of the chain with the teeth of the destination toothed wheel RD—having a greater or smaller diameter, respectively, than the starting toothed wheel RD in case of upward or downward gearshifting, respectively.

During step 1000, the mobile unit 4 can undergo a circumferential displacement about the starting toothed wheel RD, but it is not moved in the axial direction Z, namely the chain stays in engagement with the starting toothed wheel RD.

Figure 5:
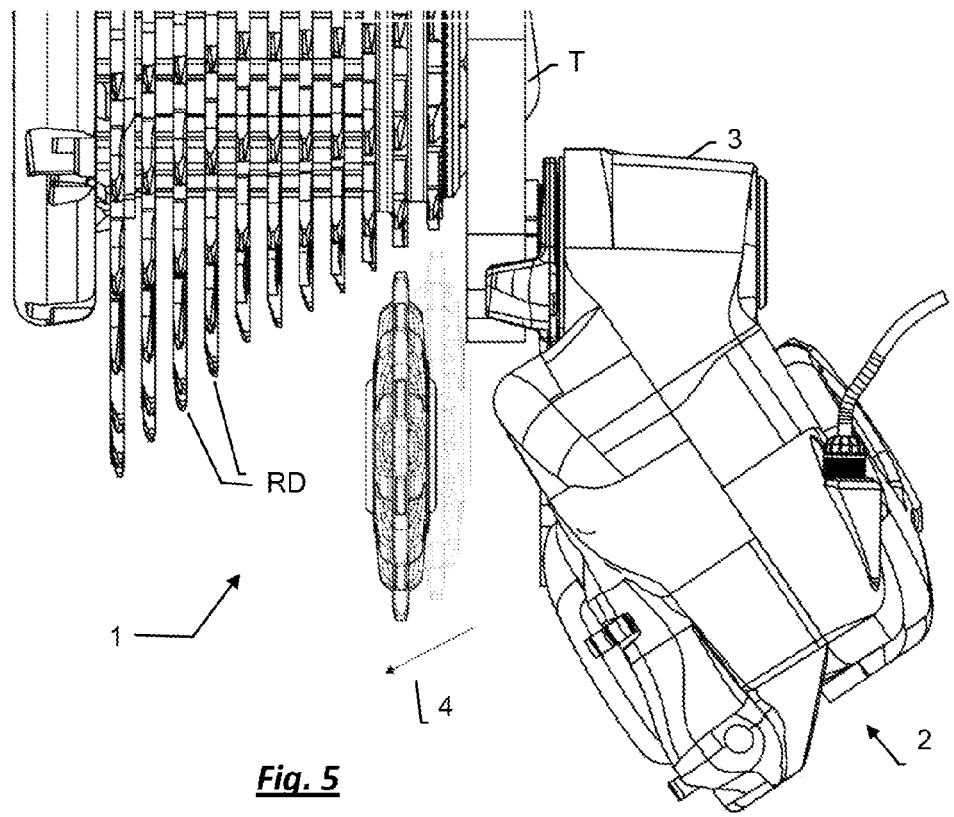
Figure 10:
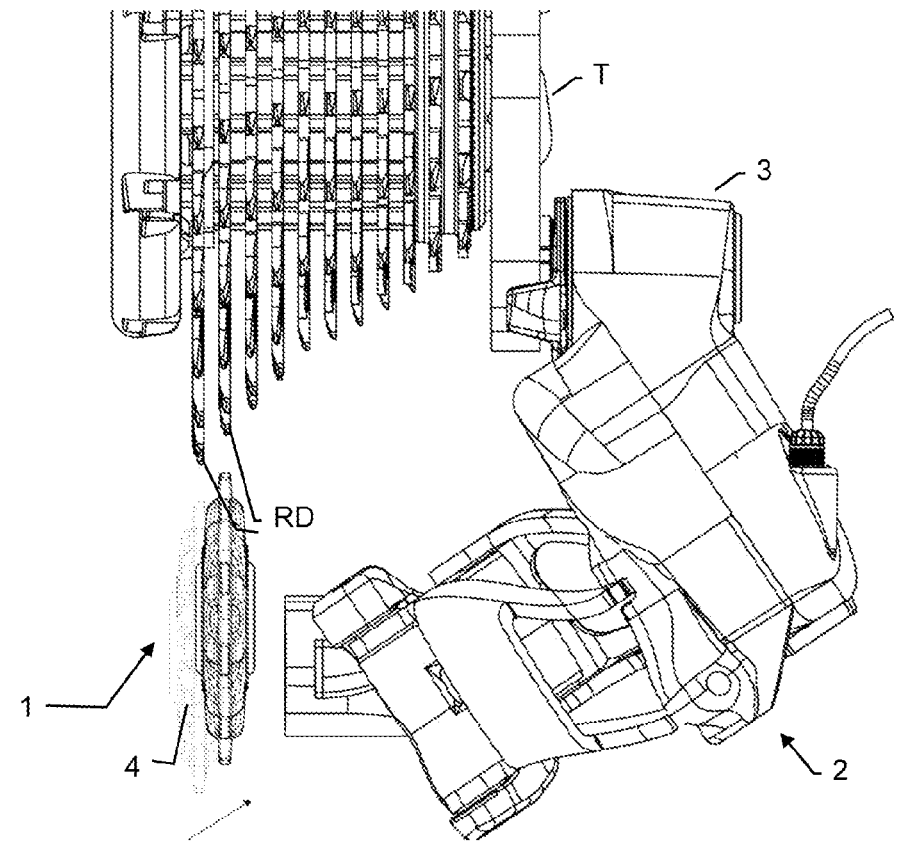

In a subsequent step 1002, the controller 7 drives the primary actuation means 5 to move the mobile unit 4 axially along the assembly of toothed wheels RD (FIG. 5 and FIG. 10). In particular, in this step 1002 the mobile unit 4 starts from a position axially at the starting toothed wheel RD, with which the chain is engaged, and is brought into a position axially at the destination toothed wheel RD, with which it is wished for the chain to engage.

During step 1002, the mobile unit 4 can undergo a circumferential displacement, and possibly also a displacement in the radial direction (as can be seen in FIG. 5 and in FIG. 10), but the main function of step 1002 is to make it carry out the axial displacement up to the destination toothed wheel RD.

Figure 6:
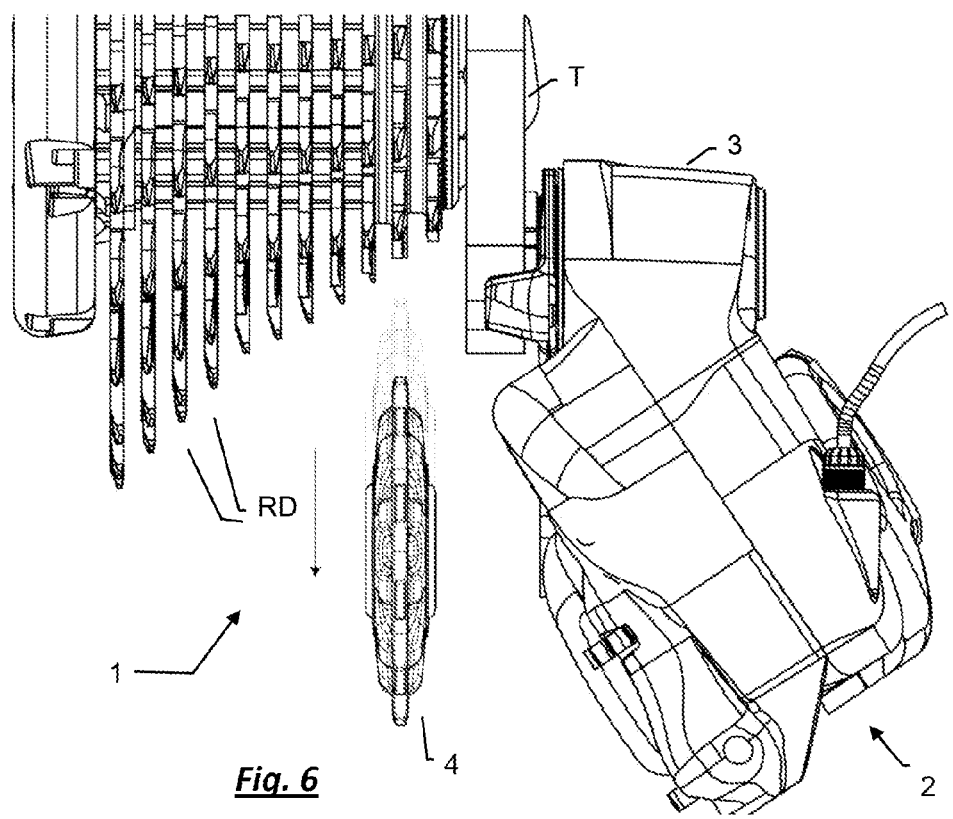
Figure 7:
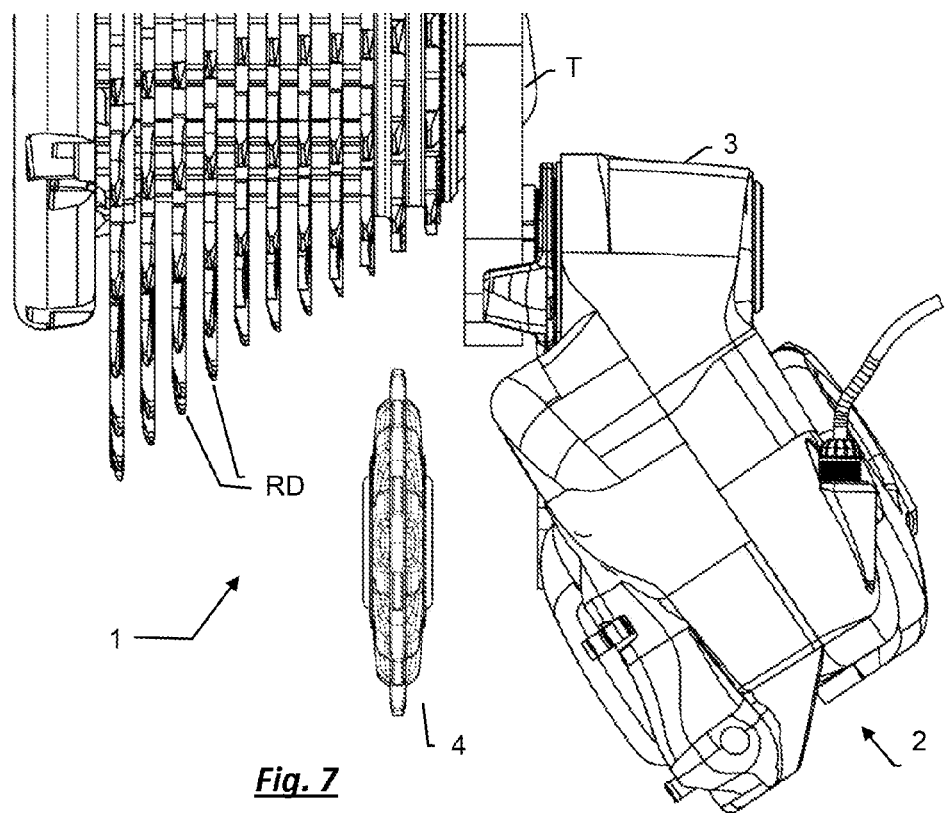
Figure 11:
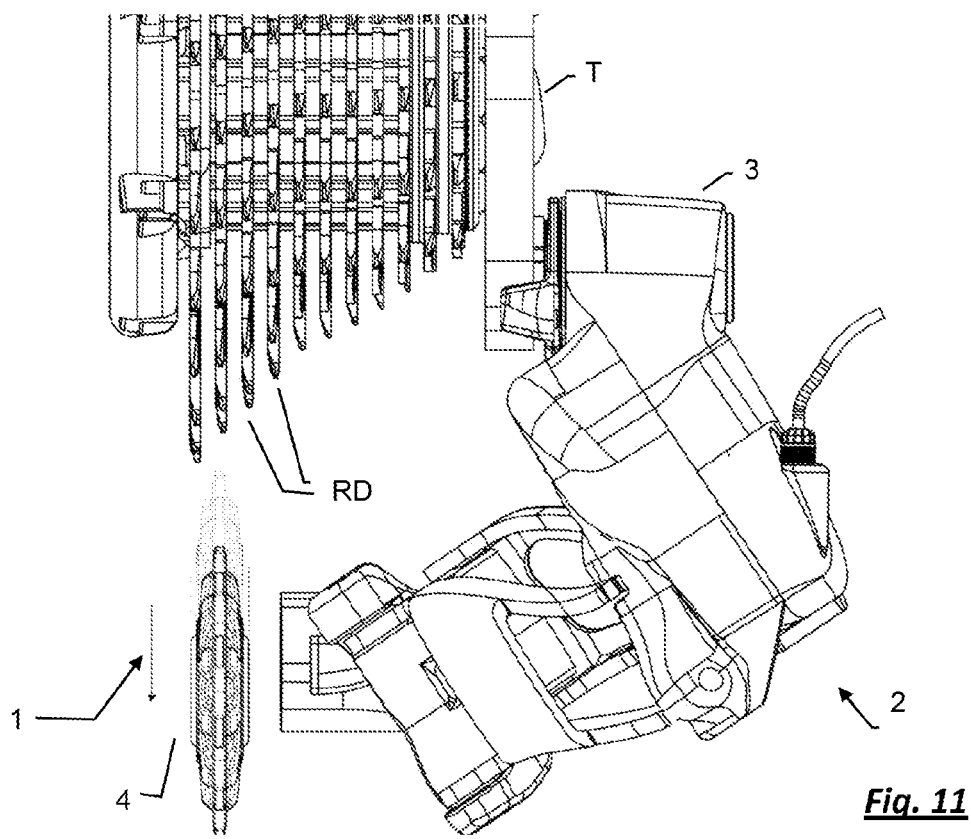
Figure 12:
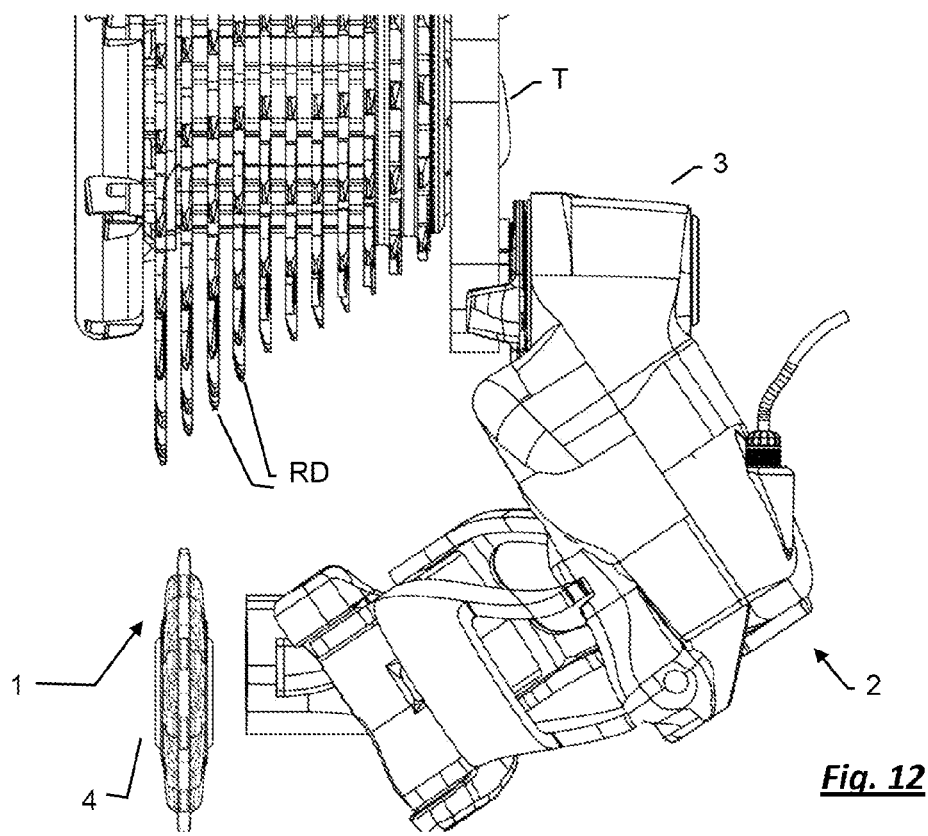

Finally, in a step 1004, the controller 7 drives the secondary actuation means 6 to bring the mobile unit 4 radially farther from the assembly of toothed wheels RD (FIG. 6 and FIG. 11). In particular, in this step 1004 the mobile unit 4 starts from a position wherein it is relatively radially close to the destination toothed wheel RD, with which the chain is now engaged, and it is brought into a position wherein it is relatively radially far from the destination toothed wheel RD (FIG. 7 and FIG. 12).

In a dual manner with respect to step 1000, the initial position of step 1004, relatively close, is such as to facilitate the engagement of the chain with the teeth of the destination toothed wheel RD, while the final position of step 1004, relatively far, is such that the chain is not unduly stressed, and therefore normal travel occurs in the smoothest possible manner.

During step 1004, the mobile unit 4 can undergo a circumferential displacement about the destination toothed wheel RD, but is not moved in the axial direction Z, namely the chain stays in engagement with the destination toothed wheel RD.

In step 1002 of moving the mobile unit 4 according to the primary displacement, like in the analogous ones of the Figures described hereinafter, the electric motor of the primary actuation means 5 is driven based on the values of the table of command values described in the introductory part. Namely, the controller 7 reads from the table of command values the value associated with the destination toothed wheel, and drives the electric motor until such a value is reached. The driving can take place with a suitable speed and/or acceleration profile.

In steps 1000 and 1004 of moving the mobile unit 4 according to the secondary displacement, like in the analogous ones of the Figures described hereinafter, the electric motor of the secondary actuation means 6 is driven based on the values of an analogous table of command values, and can be moved with a suitable speed and/or acceleration profile.

The tables of command values can be combined in a single table of command values having, for each toothed wheel RD, one, two or three axial position values (for the reasons that will become clear hereinafter) and two radial position values, one corresponding to the position relatively close to the circumference of the toothed wheel RD and one corresponding to the position relatively far from the circumference of the toothed wheel RD.

Considering that the toothed wheels RD have different diameters, for some or all gearshifting one of the two displacements in the radial direction can be omitted, namely step 1000 or step 1004 can be omitted.

In particular, in case of downward gearshifting, since one goes from a starting toothed wheel RD having a larger diameter to a destination toothed wheel RD having a smaller diameter, the position radially close to the starting toothed wheel RD obtained with step 1000 can already be sufficiently radially far from the destination toothed wheel RD, once the step 1002 of primary displacement has been carried out, so that the chain is in optimal condition for normal travel. In this case, step 1004 can be omitted.

Vice-versa, in case of upward gearshifting, since one goes from a starting toothed wheel RD having a smaller diameter to a destination toothed wheel RD having a larger diameter, step 1000 can be omitted. In this case, step 1002 of primary displacement takes place from the position radially far from the starting toothed wheel RD, a position that may be sufficiently radially close to the destination toothed wheel RD for the correct engagement of the chain with such a destination toothed wheel RD.

Figure 13:
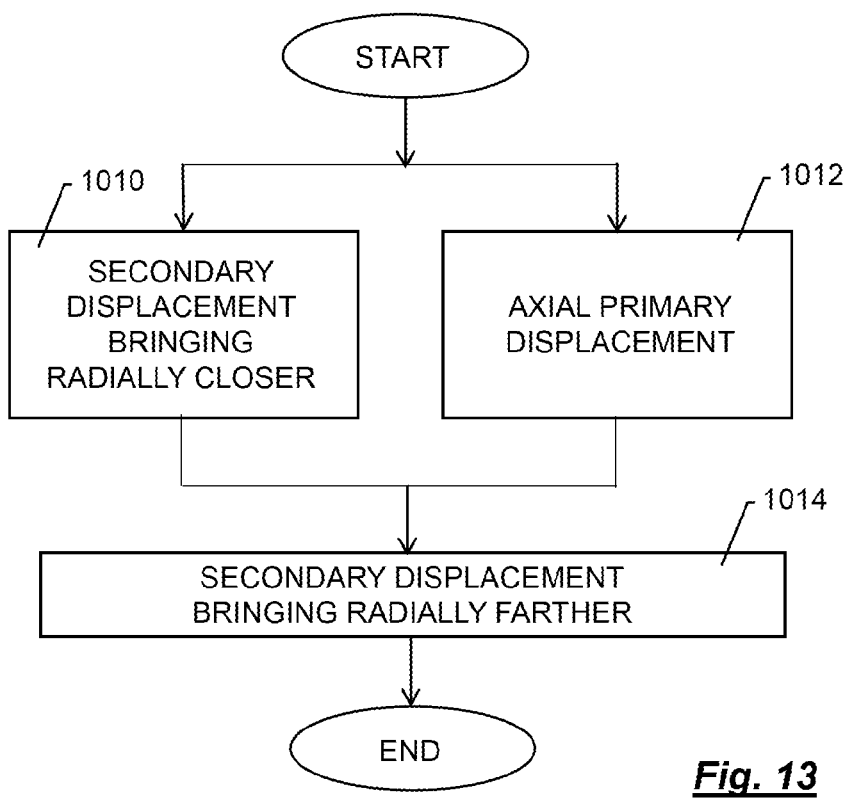
FIGS. 13 and 14 are block diagrams relating to other gearshifting modes according to the invention.

With reference to FIG. 13, a second gearshifting mode is shown. The gearshifting mode shown in FIG. 13 is particularly suitable for implementation in a derailleur of the type shown in FIGS. 20-23 and in FIGS. 24-27, wherein the primary actuation means 5 and the secondary actuation means 6 each have a respective electric motor. However, it can also be implemented in a derailleur of the type shown in FIGS. 28-40.

The gearshifting mode of FIG. 13 differs from that of FIG. 2 in that step 1010 of driving the secondary actuation means 6 to bring the mobile unit 4 radially closer to the assembly of toothed wheels RD takes place in parallel to, and at least partially simultaneously with, the step 1012 of driving the primary actuation means 5 to displace the mobile unit 4 axially from the starting toothed wheel RD to the destination toothed wheel RD.

Step 1014 of driving the secondary actuation means 6 to bring the mobile unit 4 radially farther from the assembly of toothed wheels RD, on the other hand, takes place at the end of such steps carried out in parallel 1010 and 1012.

In this way, the actual gearshifting, namely the displacement of the chain from engagement with the starting toothed wheel RD to engagement with the destination toothed wheel RD, can be carried out with extreme precision and speed, in that the chain can be displaced obliquely with respect to the toothed wheels RD keeping it at an even exactly constant distance therefrom.

Figure 14:
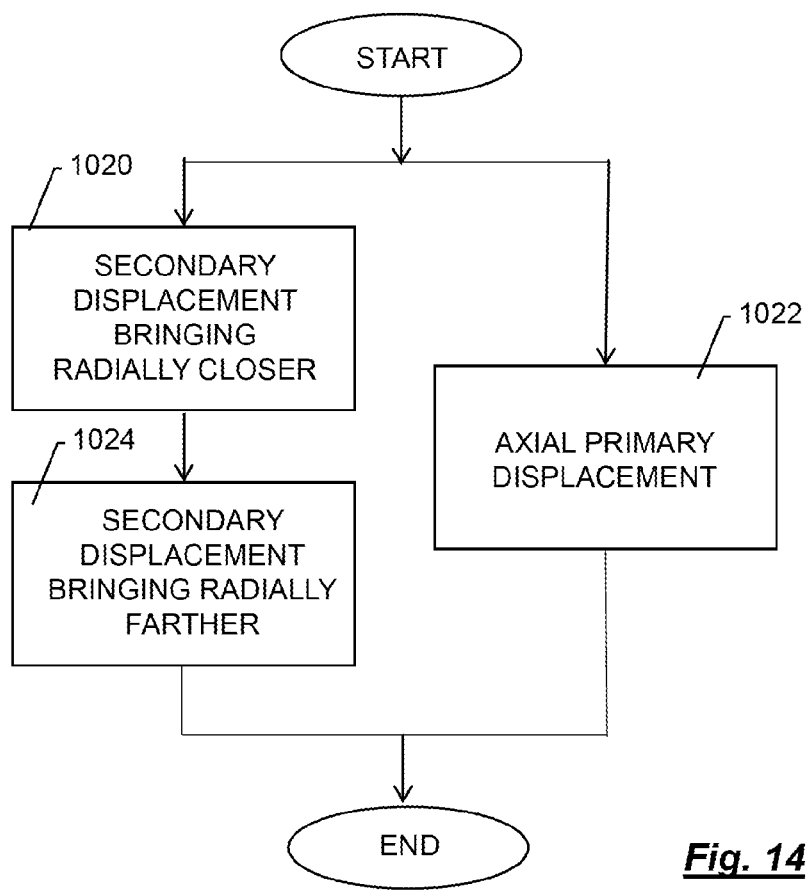

With reference to FIG. 14, a third gearshifting mode is shown. The gearshifting mode of FIG. 14 differs from those of FIGS. 2 and 13 in that the driving of the secondary actuation means 6 in both steps 1020 and 1024 of bringing the mobile unit 4 radially closer to the assembly of toothed wheels RD, and of bringing the mobile unit 4 radially farther from the assembly of toothed wheels RD, takes place in parallel to, and at least partially simultaneously with, the step 1022 of driving the primary actuation means 5 to displace the mobile unit 4 axially from the starting toothed wheel RD to the destination toothed wheel RD.

Also with this mode, gearshifting can be carried out with extreme precision and speed, controlling the radial position and the axial position of the mobile unit at every moment of its movement.

In step 1002, 1012, 1022 of primary displacement in the axial direction, the command value associated with a same destination toothed wheel RD can be different for the case of upward gearshifting, wherein the starting toothed wheel RD is of a smaller diameter than the destination toothed wheel RD, and for the case of downward gearshifting, wherein the starting toothed wheel RD is of a larger diameter than the destination toothed wheel RD. In this way it is possible to implement so-called gearshifting with "overstroke", namely to bring the chain slightly axially beyond the destination toothed wheel RD, or slightly axially before the destination toothed wheel RD, so as to facilitate the mechanical engagement thereof. Of course, the extreme toothed wheels RD of the assembly will have a single associated command value.

Figure 15:
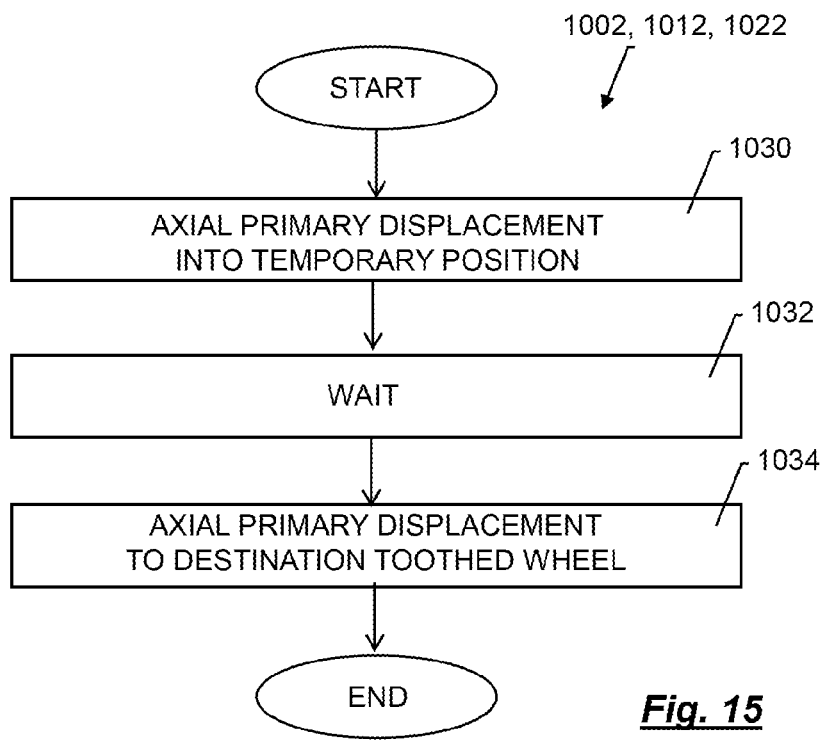
FIG. 15 is a block diagram relating to a gearshifting mode with overstroke according to the invention.

In an embodiment, shown in FIG. 15, in step 1002, 1012, 1022 of primary displacement in the axial direction, the mobile unit 4 is initially brought—in a step 1030—into the aforementioned temporary axial or overstroke position, it is maintained here temporarily—in a step 1032—and then is brought into the axial position at the destination toothed wheel RD—in a step 1034.

Preferably, when step 1022 of primary displacement in the axial direction of the embodiment of FIG. 14 is dealt with, step 1030 of axial positioning in overstroke position preferably takes place in parallel to, and at least partially simultaneously with, the step 1020 of bringing radially closer, subsequently the step 1032 of waiting in overstroke position and the step 1034 of final axial displacement take place and, simultaneously or subsequently, the step 1024 of bringing radially farther takes place.

In step 1002, 1012, 1022 of primary displacement in the axial direction, the mobile unit 4 can be displaced from a starting toothed wheel RD to a destination toothed wheel RD not immediately adjacent to the starting toothed wheel RD, in order to carry out multi-gearshifting.

Figure 16:
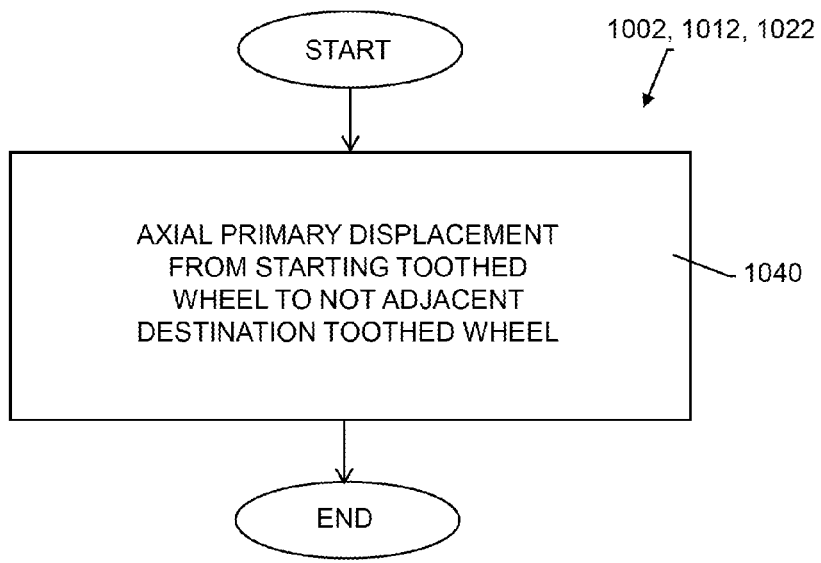
FIGS. 16-18 are block diagrams relating to some multi-gearshifting modes according to the invention.
Figure 17:
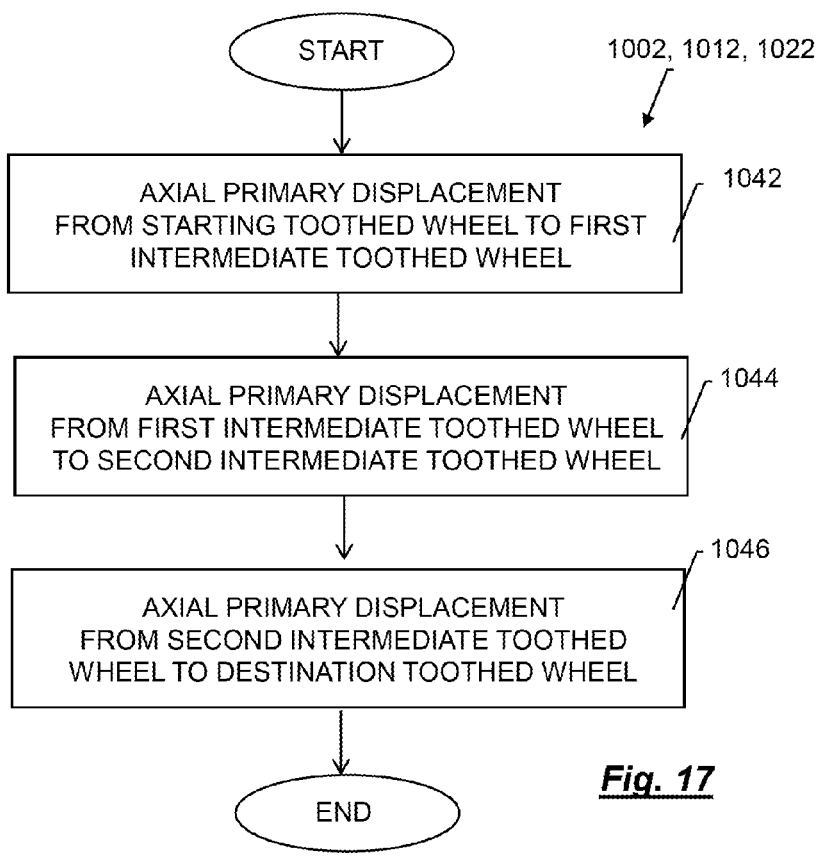

Such a primary displacement can occur directly as shown by step 1040 of FIG. 16, or it can occur in plural steps, with intermediate displacement—and possible stop—at the or each intermediate toothed wheel RD between the starting toothed wheel RD and the destination toothed wheel RD, as shown in FIG. 17 wherein triple gearshifting is shown as an example with three axial displacements 1042, 1044, 1046 of the mobile unit 4 through the primary actuation means 5: in step 1042 a primary displacement occurs from the starting toothed wheel RD to a first intermediate toothed wheel RD—preferably immediately adjacent thereto—in step 1044 a primary displacement occurs from the first intermediate toothed wheel RD to a second intermediate toothed wheel RD—preferably immediately adjacent thereto—and in step 1046 a primary displacement occurs from the second intermediate toothed wheel RD to the destination toothed wheel RD.

In both of these modes, during multi-gearshifting, the secondary displacement in the radial direction takes place only at the start and/or at the end of multi-gearshifting.

Alternatively, the multi-gearshifting can occur with a series of single gearshiftings according to the invention close together in time, namely with two or more primary displacements through the primary actuation means 5—according to whether there are one or more intermediate toothed wheels RD between the starting toothed wheel RD and the destination toothed wheel RD—and one or more secondary displacements through the secondary actuation means 6 at the or each intermediate toothed wheel RD.

The secondary displacements through the secondary actuation means 6 can be displacements bringing radially closer and/or farther.

Figure 18:
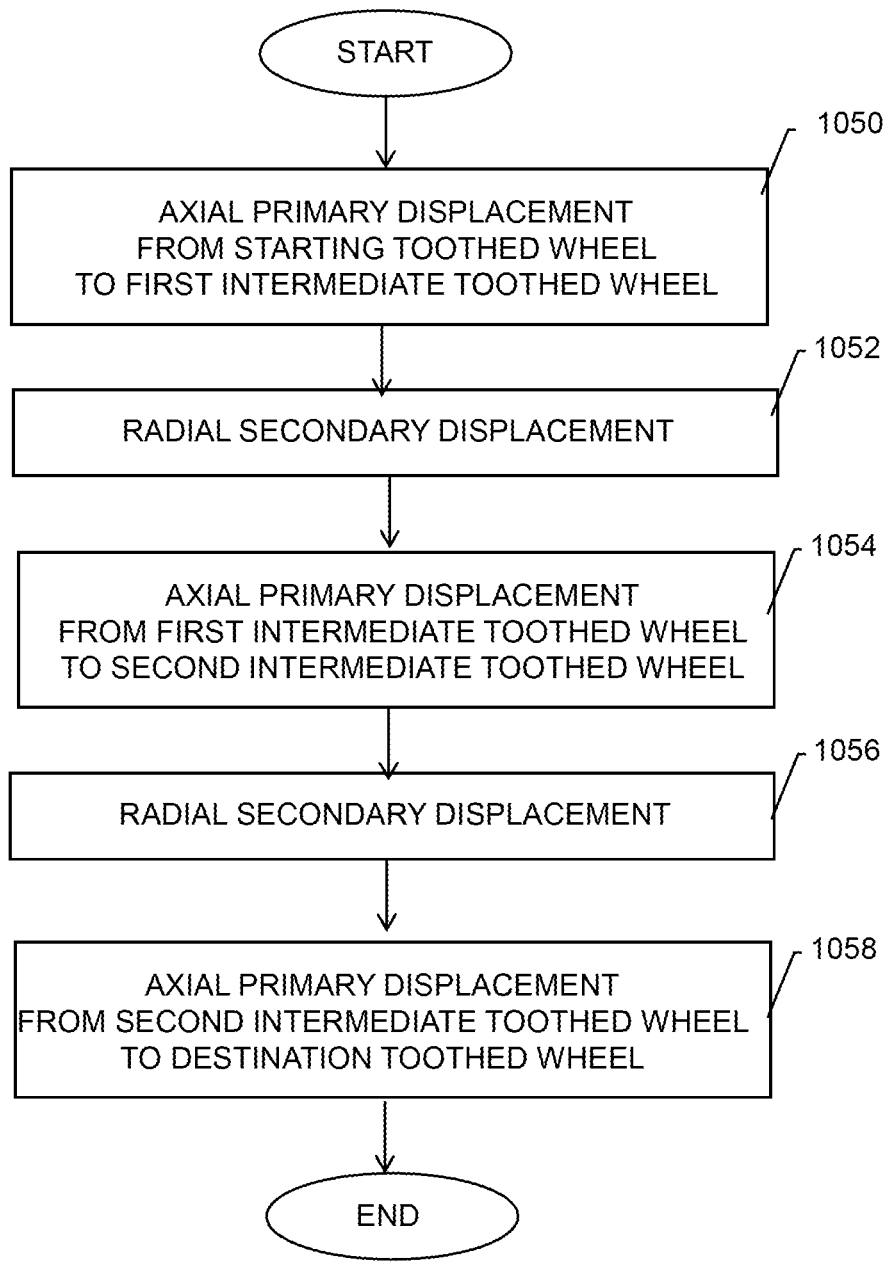

For example, as shown in FIG. 18 for the case of triple gearshifting, there can be an initial step 1050 of primary displacement from the starting toothed wheel RD to a first intermediate toothed wheel RD—preferably immediately adjacent thereto—a step 1052 of secondary displacement in the radial direction at the first intermediate toothed wheel RD, a step 1054 of primary displacement from the first intermediate toothed wheel RD to a second intermediate toothed wheel RD—preferably immediately adjacent thereto—a step 1056 of secondary displacement in the radial direction at the second intermediate toothed wheel RD, and a final step 1058 of primary displacement from the second intermediate toothed wheel RD to the destination toothed wheel RD.

As stated above, the secondary displacements at the intermediate toothed wheels RD of steps 1052, 1056 can be displacements bringing radially closer, bringing radially farther, or bringing radially farther and subsequently bringing radially closer.

If the primary displacements of steps 1050, 1054, 1056 are exclusively axial or if in any case the possible radial component is negligible, then in case of upward multi-gearshifting, the secondary displacements at the intermediate toothed wheels RD of steps 1052, 1056 can be displacements bringing radially farther, while in case of downward multi-gearshifting, the secondary displacements at the intermediate toothed wheels RD of steps 1052, 1056 can be displacements bringing radially closer.

Although in FIG. 18 the steps of axial and radial displacement are shown as consecutive, and therefore gearshifting occurs in an analogous manner to FIG. 2, these steps can also be at least partially simultaneous, analogously to what is shown in FIGS. 13 and 14.

In all cases, also in multi-gearshifting there can be positioning of the mobile unit 4 in overstroke position, preferably temporary and with definitive displacement in position of engagement with the or each intermediate toothed wheel RD, as described with reference to FIG. 15.

Figure 19:
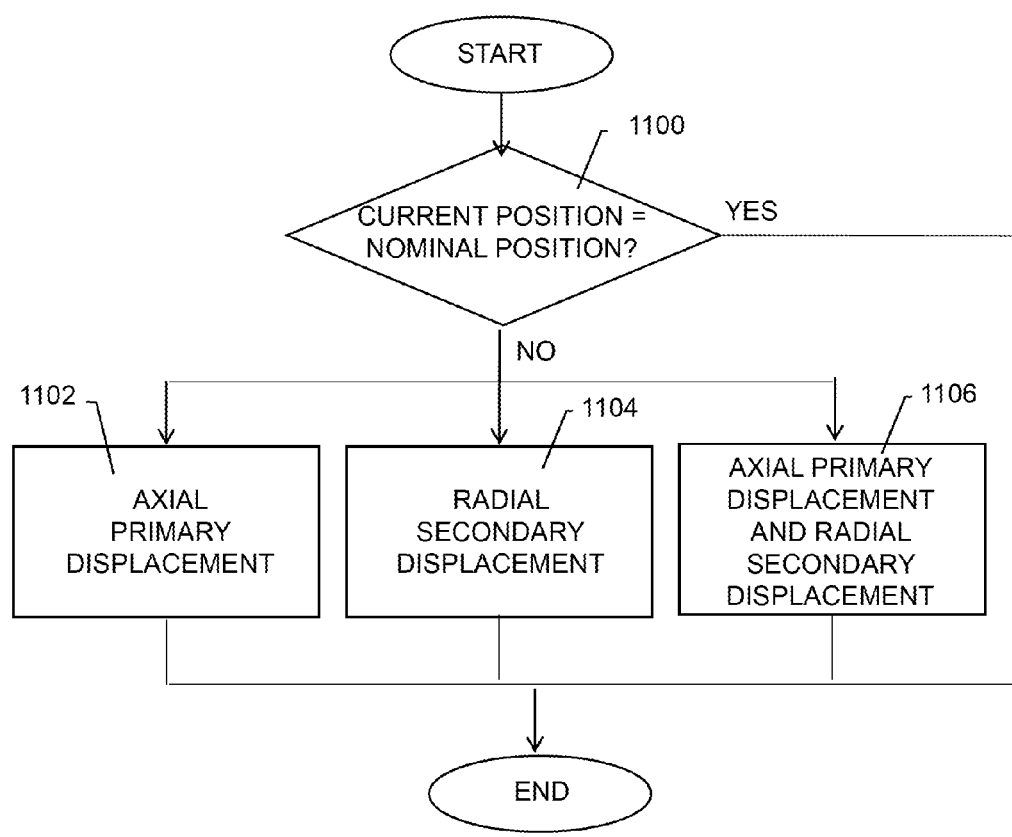
FIG. 19 is a block diagram relating to a position maintaining mode according to the invention.

With reference to FIG. 19, a mode of maintaining the optimal position of the mobile unit 4 during travel is shown, that can be achieved according to the invention.

In a step 1100, the controller 7 checks whether the current position of the mobile unit 4 corresponds to the nominal position corresponding to the current gear ratio. In particular, as explained above, the nominal position is relatively radially far from the toothed wheel RD currently engaged.

In the positive case, the procedure ends.

In the negative case, the controller 7 drives the primary actuation means 5 in a step 1102, drives the secondary actuation means 6 in a step 1104, or drives both the primary actuation means 5 and the secondary actuation means 6 in a step 1106 to displace the mobile unit 4 in the axial direction and/or in the radial direction with respect to the axis Z of the assembly of toothed wheels RD and bring it back into the nominal position. Step 1102, step 1104 or step 1106 is carried out according to the offset between the nominal position and the current position of the mobile unit 4.

Step 1100 of checking is carried out through at least one sensor, preferably at least one angular position sensor, more preferably of the absolute type, even more preferably at least one Hall effect encoder.

Such an angular position sensor between a first and a second part capable of a relative rotation movement about a given axis comprises for example, in a per se known way and described for example in EP 1 279 929 A2, a magnetized element fixedly connected to one of said first and second part, and at least one pair of Hall effect sensors arranged angularly offset from one another with respect to said given axis and fixedly connected to the other of said first and second part; said Hall effect sensors being sensitive to the presence of said magnetized element so as to generate respective output signals with variable values in a continuous field, the values of said respective output signals unambiguously identifying the relative position of said first and second part with respect to said given axis. The values of the output signals also unambiguously identify the direction of rotation of the first and second part with respect to the axis and the angular rotation speed and/or acceleration.

Step 1100 of checking can be carried out cyclically at a predetermined frequency, for example every 4 seconds.

Alternatively, step 1100 of checking can be carried out after a predetermined time since a gearshifting, for example 1 second, when it is more likely that involuntary displacements of the mobile unit 4 might occur—as described in the patent application published under US 2014/0032067 of the Applicant.

Alternatively or in addition, step 1100 of checking can be carried out upon request by the cyclist, for example because he/she has the feeling that the engagement of the chain is not smooth.

Also to carry out steps 1102, 1104 and 1106 the controller 7 will refer to the table(s) of command values described above.

Some embodiments of derailleur suitable for implementing what stated above will now be described. The derailleur being referred to is a rear derailleur. Hereinafter, specific reference numerals will be used for each embodiment.

With reference to FIGS. 20-23, a derailleur 13 according to a first embodiment of the invention comprises a support unit 20, configured to be mounted on the frame T of the bicycle, at the assembly of toothed wheels RD, and a mobile unit 50, comprising a chain guide 52.

The derailleur 13 also comprises primary actuation means 70 configured to move the mobile unit 50 with respect to the support unit 20, so as to impart onto the chain guide 52 a primary displacement having at least a component in axial direction with respect to the axis Z of the assembly of toothed wheels RD.

The derailleur 13 also comprises secondary actuation means 80 configured to move the mobile unit 50 with respect to the support unit 20, so as to impart onto the chain guide 52 a secondary displacement having at least a component in radial direction with respect to the axis Z of the assembly of toothed wheels RD. The secondary actuation means 80, as will be explained hereafter, are capable of moving the mobile unit 50 independently of the primary actuation means 70.

The support unit 20 comprises a support body 21 and a first fixing unit 23, for mounting the support unit 21 on the frame T of the bicycle. The mobile unit 50 comprises, in addition to the chain guide 52, a mobile body 51 and a second fixing unit 53, for mounting the chain guide 52 on the mobile body 51.

In the first fixing unit 23, a chain tensioning spring 25 is provided.

The primary actuation means 70 provide for an articulated quadrilateral linkage between the support body 21 and the mobile body 51, which are connected together through a pair of parallel connecting rods 71, 72, articulated both to the support body 21 at pivots 73, 74, and to the mobile body 51, at pivots 75, 76. An electric motor 77 is mounted on the pivot 73 (cradle-shaped, for receiving the motor 77) and has a shaft 78 engaged in a bushing 79 mounted on the pivot 76, diagonally opposite the pivot 73. Reference numeral 77a indicates a cable for power supply and the control signal of the motor 77.

The motor 77 is thus suitable for imposing an approach/distancing of the bushing 79 to the motor 77 and consequently a lengthening/shortening of the diagonal of the articulated quadrilateral linkage between the two opposite pivots 73, 76 and therefore a deformation of the articulated quadrilateral linkage itself. This deformation in turn determines a displacement of the mobile body 51 with respect to the support body 21 and thus the primary displacement of the chain guide 52 with respect to the axis Z of the assembly of toothed wheels RD.

The first fixing unit 23 comprises a pivot, formed by two threaded elements 26a, 26b coaxial to one another, intended to be mounted fixed on the frame T; the support body 21 and the chain tensioning spring 25 are rotatably mounted on the pivot 26a, 26b through interposition of a sliding bearing 27. The first fixing unit 23 also comprises a first ring 28, rotatably mounted on the pivot 26a, 26b, provided with a tooth 29 for resting on the frame T and with a seat 30 in engagement with a first end of the chain tensioning spring 25.

The secondary actuation means 80 comprise a second ring 81, rotatably mounted in the support body 21 and on the pivot 26a, 26b and provided with a seat 82 in engagement with a second end of the chain tensioning spring 25. The secondary actuation means 80 also comprise a toothed sector 83 formed on the second ring 81, and a worm screw 84 in engagement with the toothed sector 83.

The worm screw 84 is set in rotation by an electric motor 85, through a reduction stage 86, comprising toothed wheels of different diameter engaged with each other in succession, so as to determine the desired gear ratio between the motor 85 and the worm screw 84.

The chain guide 52 comprises a pair of wheels 54, 55, idle mounted on an arm 56. The second fixing unit 53 comprises a pivot 57 fixedly connected to the arm 56 of the chain guide 52 and rotatably mounted in the mobile body 51; a torsion spring 58 is mounted on the pivot 57, with a first end inserted in a seat 59 formed in an insert 63 firmly fixed in the mobile body 51 and a second end inserted in a seat 60 formed on the arm 56.

The spring 58, like the spring 25, contributes to tensioning the chain. More specifically, the two springs 25 and 58 counteract each other: the spring 25 tends to lengthen the path of the chain angularly pushing the mobile body 51—namely, tending to rotate the mobile body 51 about the pivot 26a, 26b in the direction M—so as to push the chain guide 52 radially away from the assembly of toothed wheels RD; the spring 58, on the other hand, tends to lengthen the path of the chain by angularly pushing the chain guide 52 in the direction N so as to push the wheel 54 radially towards the assembly of toothed wheels RD. The setup of the chain is thus in equilibrium between the thrusts of these springs 25 and 58, and according to this setup the chain guide 52 is more or less radially close to the axis Z of the assembly of toothed wheels RD.

By acting on the motor 85 of the secondary actuation means 80 it is possible to angularly displace the seat 82 of the second end of the spring 25, thus changing the preload of the spring 25 itself. Therefore, the second ring 81, the seat 82, the toothed sector 83 and the worm screw 84 form a linkage for adjusting the preload of the chain tensioning spring 25, capable of determining a change in the setup of the chain guide 52 that involves the secondary displacement of the chain guide 52, having at least a component in radial direction with respect to the axis Z of the assembly of toothed wheels RD.

On the other hand, by acting on the motor 77 of the primary actuation means 70, as described earlier, the primary displacement of the chain guide 52 with respect to the axis Z of the assembly of toothed wheels RD, i.e. the displacement necessary to obtain gearshifting, is obtained by displacing the chain from one of the toothed wheels RD to another.

The two displacements of the chain guide 52, the primary displacement (responsible for gearshifting) and the secondary displacement (responsible for the radial distance of the chain guide from the axis Z), are thus obtained totally independently of each other, thanks to the primary actuation means 70 and secondary actuation means 80. It thus becomes possible to determine the optimal distance of the chain guide 52 from the axis Z in every situation, of travel or of gearshifting.

This result has been obtained, in accordance with the first embodiment shown in FIGS. 20 to 23 and just described, by providing for the secondary actuation means 80 to act through their motor 85 on the spring 25 of the first fixing unit 23.

A second embodiment of the invention is shown in FIGS. 24 to 27.

With reference to these Figures, a derailleur 113 comprises a support unit 120, configured to be mounted on the frame T of the bicycle, at the assembly of toothed wheels RD of the gearshift 1, and a mobile unit 150, comprising a chain guide 152.

The derailleur 113 also comprises primary actuation means 170 configured to move the mobile unit 150 with respect to the support unit 120, so as to impart onto the chain guide 152 a primary displacement having at least a component in axial direction with respect to the axis Z of the assembly of toothed wheels RD.

The derailleur 113 also comprises secondary actuation means 180 configured to move the mobile unit 150 with respect to the support unit 120, so as to impart onto the chain guide 152 a secondary displacement having at least a component in radial direction with respect to the axis Z of the assembly of toothed wheels RD. The secondary actuation means 180, as will be explained hereafter, are capable of moving the mobile unit 150 independently of the primary actuation means 170.

The support unit 120 comprises a support body 121 and a first fixing unit 123, for mounting the support unit 121 on the frame T. The mobile unit 150 comprises, as well as the chain guide 152, a mobile body 151 and a second fixing unit 153, for mounting the chain guide 152 on the mobile body 151.

In the first fixing unit 123 a chain tensioning spring 125 is provided.

The primary actuation means 170 provide for an articulated quadrilateral linkage between the support body 121 and the mobile body 151, which are connected together through a pair of parallel connecting rods 171, 172, articulated both to the support body 121 at pivots 173, 174, and to the mobile body 151, at pivots 175, 176. An electric motor 177 is mounted on the pivot 173 (shaped like a cradle, for receiving the motor 177) and has a shaft 178 engaged in a bushing 179 mounted on the pivot 176, diagonally opposite the pivot 173. Reference numeral 177a indicates a cable for power supply and the control signal of the motor 177. The motor 177 is thus suitable for imposing an approach/distancing of the bushing 179 to the motor 177 and consequently a lengthening/shortening of the diagonal of the articulated quadrilateral linkage between the two opposite pivots 173, 176 and therefore a deformation of the articulated quadrilateral linkage itself. This deformation in turn determines a displacement of the mobile body 151 with respect to the support body 121 and thus the primary displacement of the chain guide 152 with respect to the axis Z of the assembly of toothed wheels RD.

The first fixing unit 123 comprises a pivot, formed by two threaded elements 126a, 126b coaxial to one another, intended to be mounted fixed on the frame T; the support body 121 and the chain tensioning spring 125 are rotatably mounted on the pivot 126a, 126b, through interposition of a sliding bearing 127. The first fixing unit 123 also comprises a first ring 128, rotatably mounted on the pivot 126a, 126b, provided with a tooth 129 for resting on the frame T and with a seat 130 in engagement with a first end of the chain tensioning spring 125.

Differently from the derailleur 13, in the derailleur 113 the second end of the spring 125 is engaged in a seat 131, formed in the support body 121.

The chain guide 152 comprises a pair of wheels 154, 155, idle mounted on an arm 156. The second fixing unit 153 comprises a pivot 157 fixedly connected to the mobile body 151, on which pivot 157 the arm 156 of the chain guide 152 is rotatably mounted; a torsion spring 158 is mounted on the pivot 157, with a second end inserted in a seat 160 formed on the arm 156.

The secondary actuation means 180 comprise a second ring 191, rotatably mounted in the mobile body 151 and on the pivot 157 and provided with a seat 192 in engagement with a second end of the spring 158. The secondary actuation means 180 also comprise a toothed sector 193 formed on the second ring 191, and a worm screw 194 in engagement with the toothed sector 193.

The worm screw 194 is set in rotation by an electric motor 195, through a reduction stage 196, comprising toothed wheels of different diameter engaged with one another in succession, so as to determine the desired gear ratio between the motor 195 and the worm screw 194. Reference numeral 195a indicates a cable for power supply and the control signal of the motor 195.

The spring 158, like the spring 125, contributes to tensioning the chain. More specifically, the two springs 125 and 158 counteract each other: the spring 125 tends to lengthen the path of the chain angularly pushing the mobile body 151—namely, tending to rotate the mobile body 151 about the pivot 126a, 126b in the direction M—so as to push the chain guide 152 radially away from the assembly of toothed wheels RD; the spring 158, on the other hand, tends to lengthen the path of the chain by angularly pushing the chain guide 152 in the direction N so as to push the wheel 154 radially towards the assembly of toothed wheels RD. The setup of the chain is thus in equilibrium between the thrusts of these springs 125 and 158, and according to this setup the chain guide 152 is more or less radially close to the axis Z of the assembly of toothed wheels RD.

By acting on the motor 195 of the secondary actuation means 180 it is possible to angularly displace the seat 192 of the second end of the spring 158, thus changing the preload of the spring 158 itself. Therefore, the second ring 191, the seat 192, the toothed sector 193 and the worm screw 194 form a linkage for adjusting the preload of the chain tensioning spring 158, capable of determining a change in the setup of the chain guide 152 that involves the secondary displacement of the chain guide 152, having at least a component in radial direction with respect to the axis Z of the assembly of toothed wheels RD.

On the other hand, by acting on the motor 177 of the primary actuation means 170, as described earlier, the primary displacement of the chain guide 152 with respect to the axis Z of the assembly of toothed wheels RD, i.e. the displacement necessary to obtain gearshifting, is obtained by displacing the chain from one of the toothed wheels RD to another.

The two displacements of the chain guide 152, the primary displacement (responsible for gearshifting) and the secondary displacement (responsible for the radial distance of the chain guide from the axis Z), are thus obtained totally independently of one another, thanks to the primary actuation means 170 and secondary actuation means 180. It thus becomes possible to determine the optimal distance of the chain guide 152 from the axis Z in any situation, of travel or of gearshifting.

This result has been obtained, in accordance with the second embodiment shown in FIGS. 24 to 27 and just described, by providing for the secondary actuation means 180 to act through their motor 195 on the spring 158 of the second fixing unit.

A third embodiment of the invention is shown in FIGS. 28 to 40.

With reference to these Figures, a derailleur 213 comprises a support unit 220, configured to be mounted on the frame T of the bicycle, at the assembly of toothed wheels RD of the gearshift 1, and a mobile unit 250, comprising a chain guide 252.

The derailleur 213 also comprises primary actuation means 270 configured to move the mobile unit 250 with respect to the support unit 220, so as to impart onto the chain guide 252 a primary displacement having at least a component in axial direction with respect to the axis Z of the assembly of toothed wheels RD.

The derailleur 213 also comprises secondary actuation means 280 configured to move the mobile unit 250 with respect to the support unit 220, so as to impart onto the chain guide 252 a secondary displacement having at least a component in radial direction with respect to the axis Z of the assembly of toothed wheels RD. The secondary actuation means 280, as will be explained hereafter, are capable of moving the mobile unit 250 independently of the primary actuation means 270.

The support unit 220 comprises a support body 221 and a first fixing unit 223, for mounting the support unit 221 on the frame T. The mobile unit 250 comprises, as well as the chain guide 252, a mobile body 251 and a second fixing unit 253, for mounting the chain guide 252 on the mobile body 251.

In the first fixing unit 223 a chain tensioning spring 225 is provided.

The primary actuation means 270 provide for an articulated quadrilateral linkage between the support body 221 and the mobile body 251, which are connected together through a pair of parallel connecting rods 271, 272, articulated both to the support body 221 at pivots 273, 274, and to the mobile body 251, at pivots 275, 276.

Differently from the derailleurs 13 and 113, in the derailleur 213 the deformation of the articulated quadrilateral linkage is obtained thanks to the connecting rod 271 being set in rotation, it being provided for this purpose with a toothed sector 261, engaged with a motorised toothed sector 262, in the manner that will be described hereafter. The toothed sector 262 extends so as to cover for example an angle of 70°.

The deformation of the articulated quadrilateral in turn determines a displacement of the mobile body 251 with respect to the support body 221 and thus the primary displacement of the chain guide 252 with respect to the axis Z of the assembly of toothed wheels RD.

The first fixing unit 223 comprises a pivot 226a, intended to be mounted fixed on the frame T through a lock washer 226b (of the dismountable type); the support body 221 and the chain tensioning spring 225 are rotatably mounted on the pivot 226a, through interposition of a sliding bearing 227. The first fixing unit 223 also comprises a first ring 228, rotatably mounted on the pivot 226a, provided with a tooth 229 for resting on the frame T and with a seat 230 in engagement with a first end of the chain tensioning spring 225.

The secondary actuation means 280 comprise a second ring 281, rotatably mounted in the support body 221 and on the pivot 226a, 226b and provided with a seat 282 in engagement with a second end of the chain tensioning spring 225. The secondary actuation means 280 also comprise a toothed sector 283 formed on the second ring 281, and a toothed wheel 284 (motorised in the manner that will be described hereafter) in engagement with the toothed sector 283. The toothed wheel 284 rotates for example by an angle of 35°-40°.

The toothed sector 262 and the toothed wheel 284 are set in rotation by a single shared electric motor 301, with a transmission 310 being provided for having a primary output formed by the toothed sector 262 and a secondary output formed by the toothed wheel 284, respectively associated with the primary actuation means 270 and with the secondary actuation means 280. Reference numeral 301a indicates a cable for power supply and the control signal of the motor 301.

The chain guide 252 comprises a pair of wheels 254, 255, idle mounted on an arm 256. The second fixing unit 253 comprises a pivot 257 fixedly connected to the mobile body 251, on which pivot 257 the arm 256 of the chain guide 252 is rotatably mounted; a torsion spring 258 is mounted on the pivot 257, with a first end inserted in a seat 259 formed in an insert 263 firmly fixed in the mobile body 251 and a second end inserted in a seat 260 formed on the arm 256.

The spring 258, like the spring 225, contributes to tensioning the chain. More specifically, the two springs 225 and 258 counteract each other: the spring 225 tends to lengthen the path of the chain angularly pushing the mobile body 251—namely, tending to rotate the mobile body 251 about the pivot 226a, 226b in the direction M—so as to push the chain guide 252 radially away from the assembly of toothed wheels RD; the spring 258, on the other hand, tends to lengthen the path of the chain by angularly pushing the chain guide 252 in the direction N so as to push the wheel 254 radially towards the assembly of toothed wheels RD. The setup of the chain is thus in equilibrium between the thrusts of these springs 225 and 258, and according to this setup the chain guide 252 is more or less radially close to the axis Z of the assembly of toothed wheels RD.

The transmission 310 comprises a casing 311 in which the motor 301 is housed. In the casing 311 a primary shaft 312 is also rotatably housed, extending in the direction of an axis A and set in rotation by the motor 301 through a reduction stage 313, which comprises toothed wheels of different diameter and of various configuration, engaged with each other in succession, so as to determine the desired gear ratio between the motor 301 and the primary shaft 312. On the primary shaft 312 a primary toothed wheel 314 is fixedly fitted. In the casing 311 two secondary shafts are also housed—a first secondary shaft 315 and a second secondary shaft 316, parallel to one another and to the primary shaft 312. A first secondary toothed wheel 317 is fixedly fitted onto the first secondary shaft 315, and a second secondary toothed wheel 318 is fixedly fitted onto the second secondary shaft 316.

The transmission 310 further comprises, in the casing 311, a first outlet shaft 320 and a second outlet shaft 321, both extending according to an axis B substantially perpendicular to the axis A. On the first outlet shaft 320, inside the casing 311, a toothed wheel 322 is fixedly fitted (in the form of a ring provided with a toothed sector of limited angular width) which is in meshed engagement with a worm screw 324 fixedly fitted on the first secondary shaft 315. The first outlet shaft 320 protrudes from the casing 311 and on it—outside of the casing 311—the toothed sector 262 is fitted. On the second outlet shaft 321, inside the casing 311, a toothed wheel 323 (in the form of a ring provided with a toothed sector of limited angular width) is fixedly fitted, which is in meshed engagement with a worm screw 325 fixedly fitted on the second secondary shaft 316. The second outlet shaft 321 protrudes from the casing 311 and on it—outside the casing 311—the toothed wheel 284 is fitted.

The transmission 310 further comprises, again in the casing 311, an auxiliary toothed wheel 330, mounted so as to be axially mobile in the casing 310 along an auxiliary axis C, parallel to the axis A of the primary and secondary shafts 312, 315, 316. The auxiliary toothed wheel 330 is in meshed engagement permanently with the primary toothed wheel 314 and selectively with one or other of the secondary toothed wheels 317, 318. For this purpose, the auxiliary toothed wheel 330 is fixedly fitted onto an auxiliary shaft 331, rotatably carried by a slide 332 guided in a mobile manner along the auxiliary axis C, actuated for this purpose by an electromechanical actuator 333. By acting on this actuator 333, it is possible to displace the auxiliary toothed wheel 330 along the axis C, alternatively towards and in engagement with one or other of the secondary toothed wheels 317, 318 (gearshifting control condition or radial distance adjustment condition), in such a way obtaining that the motor 301 is coupled alternatively with the toothed sector 262 (through the reduction stage 313, the primary shaft 312, the primary toothed wheel 314, the auxiliary toothed wheel 330, the secondary toothed wheel 317, the first secondary shaft 315, the worm screw 324, the toothed wheel 322, the first outlet shaft 320) or with the toothed wheel 284 (through the reduction stage 313, the primary shaft 312, the primary toothed wheel 314, the auxiliary toothed wheel 330, the secondary toothed wheel 318, the second secondary shaft 316, the worm screw 325, the toothed wheel 323, the second outlet shaft 321).

By thus acting on the motor 301 when the actuator 333 is in the gearshifting control condition, a rotation of the toothed sector 262 is obtained and with it of the toothed sector 261, with a consequent deformation of the articulated quadrilateral and primary displacement of the chain guide 252 along the axis Z.

On the other hand, by acting on the motor 301 when the actuator 333 is in the radial distance adjustment condition, a rotation of the toothed wheel 284 is obtained and with it of the toothed sector 283, of the ring 281 and thus of the seat 282, thus changing the preload of the spring 225 itself. Therefore, the second ring 281, the seat 282, the toothed sector 283 and the toothed wheel 284 form a linkage for adjusting the preload of the chain tensioning spring 225, capable of determining a change in the setup of the chain guide 252 that involves the secondary displacement of the chain guide 252, having at least a component in radial direction with respect to the axis Z of the assembly of toothed wheels RD.

The two displacements of the chain guide 252, the primary displacement (responsible for gearshifting) and the secondary displacement (responsible for the distance of the chain guide 252 from the axis Z), are thus obtained totally independently of one another, thanks to the primary actuation means 270 and secondary actuation means 280. It thus becomes possible to determine the optimal radial distance of the chain guide from the axis Z in any situation, of travel or of gearshifting.

This result has been obtained, in accordance with the third embodiment shown in FIGS. 28 to 40 and just described, even in the presence of a single motor 301, providing for the transmission 310 that places the motor 301 selectively in connection with the primary actuation means 270 and with the secondary actuation means 280.

It should be noted that in this third embodiment the derailleur 213 provides for the secondary actuation means 280 to act on the spring 225 of the first fixing unit 223, and the casing 311 of the transmission 310 to be housed on the support unit 220. In another embodiment (neither shown nor described in detail), it will be possible to use a single motor with an analogous transmission to the transmission 310 just described, but acting on the spring of the second fixing unit; in this case, the casing of the transmission will be housed on the mobile unit.

The above is a description of several embodiments of inventive aspects, and further changes can be brought without departing from the scope of the present invention. The shape and/or size and/or position and/or orientation of the various components and/or the succession of the various steps can be changed. The functions of an element or step can be carried out by two or more components or steps, and vice-versa. Components shown directly connected or contacting each other may have intermediate structures arranged between them. Steps shown as directly subsequent can have intermediate steps carried out between them. The details shown in a Figure and/or described with reference to a Figure or to an embodiment can apply in other Figures or embodiments. Not all of the details shown in a Figure or described in a same context need necessarily be present in one and the same embodiment. Features or aspects that turn out to be innovative with respect to the prior art, by themselves or in combination with other features, should be considered as described per se, irrespective of what is explicitly described as innovative.

For example, the primary actuation means 5 could comprise a motor acting on the diagonal of the articulated parallelogram also in the embodiment of FIGS. 28-40, and vice-versa a motor acting on one of the connecting rods also in the embodiments of FIGS. 20-23 and 24-27.

In the embodiment of FIGS. 28-40, the two outputs have the same rotation speed, but this is not strictly necessary.

In the embodiment of FIGS. 28-40, there can be an angular position sensor or encoder associated with the drive shaft and/or an angular position sensor associated with the auxiliary shaft 331.

In the embodiment of FIGS. 28-40, as an alternative or in addition to the angular position sensor associated with the drive shaft or with the auxiliary shaft 331 it is possible to provide for a pair of angular position sensors, of which one is associated with the first outlet shaft 320, and one is associated with the second outlet shaft 321.

Instead of one or more angular position sensors of the Hall effect type it is possible to use one or more different types of sensors, such as other types of angular position sensors, sensors of the longitudinal position of the auxiliary toothed wheel 330 in the embodiment of FIGS. 28-40, angular or linear speed sensors, angular or linear acceleration sensors.

The embodiments wherein the secondary actuation means 6 act on the first fixing unit are more advantageous with respect to the embodiments wherein the secondary actuation means 6 act on the second fixing unit in that the transportation of signal and/or data cables to a mobile component is avoided; moreover the chain guide, which is the component that engages with the chain and thus where maintenance is most frequent, remains freer and more accessible.

In the first and in the second embodiment, the pivots formed by the threaded elements 26a, 26b and 126a, 126b can be replaced by pivots with locking washer, analogous to the pivot 226*a* and the washer 226*b* of the third embodiment. Reciprocally, in the third embodiment, the pivot 226*a* and the locking washer 226*b* can be replaced by pivots formed by two threaded elements analogous to the threaded elements 26*a*, 26*b* and 126*a*, 126*b* of the first and second embodiment.

Although the invention is particularly useful in case of a rear derailleur, it can also be applied to a front derailleur.

Although the invention is particularly useful in case of a derailleur having an electric motor for moving the assembly of toothed wheels in the axial direction, it can also be applied to a derailleur wherein the movement in the axial direction of the assembly of toothed wheels takes place mechanically, for example through a Bowden cable.

In the embodiment shown in FIGS. 28-40 a conical toothed wheel 284 has been used for the secondary actuation means and a cylindrical toothed sector 262 has been used for the primary actuation means. It is also possible to use a conical toothed wheel for the primary actuation means and a cylindrical toothed sector for the secondary actuation means, or two conical toothed wheels or two cylindrical toothed sectors.

In the embodiment shown in FIGS. 28-40, a push-pull electromagnetic actuator has been used, which acts on the position of the auxiliary toothed wheel 330, displacing it between the engagement with a toothed wheel 317 part of the primary actuation means and the engagement with a toothed wheel 318 part of the secondary actuation means. It is possible to provide for the auxiliary toothed wheel 330 to also take up an intermediate position in which it is engaged both with the toothed wheel 317 part of the primary actuation means and with the toothed wheel 318 part of the secondary actuation means. In this way, a mode becomes available in which the primary displacement and the secondary displacement are actuated simultaneously. Of course, in this case the rest position could not be intermediate between the two toothed wheels 317 and 318, so that the engaging with one of the actuation means would be faster than with the other.

In the embodiment shown in FIGS. 28-40, an auxiliary toothed wheel 330 has been used that is displaced in the axial direction and frontally engages with the toothed wheel 317 and with the toothed wheel 318, the three toothed wheels having parallel axes and the two toothed wheels 317 and 318 of the primary and secondary actuation means being axially offset from one another. Other embodiments can be devised, in which the auxiliary toothed wheel 330 is brought to engage with the two toothed wheels 317 and 318 with a transversal movement to the axes of the latter; in this case it is not necessary for them to be axially offset from one another.

Instead of an electromagnetic actuator, in particular of the push-pull type, it is possible to use a different actuator to displace the auxiliary toothed wheel 330. Alternatively or in addition, any other structure and/or component can be used to make the transmission 310.

Instead of acting on the preload of one of the springs of the fixing assemblies, the secondary actuation means could be capable of acting on both, acting simultaneously on both or selectively on one and/or on the other.

In the embodiments shown, the secondary actuation means always act on the preload of a spring. However, this is not strictly necessary. As an example, there can be a system for moving the mobile unit comprising two electro-motors or two cascade pistons having perpendicular axes.

Indeed, it is worthwhile highlighting that through the provision of two actuation means capable of moving the mobile unit independently in two perpendicular directions, it is no longer necessary for the primary displacement of the chain guide to be oblique with respect to the axis of the assembly of toothed wheels so as to follow as much as possible the envelope of the toothed wheels themselves. Therefore it is also not strictly necessary to provide for an articulated parallelogram.

What is claimed is:

1. A derailleur of a bicycle gearshift, comprising:
    a support unit, configured to be mounted on a bicycle frame at an assembly of coaxial toothed wheels, the support unit includes a first fixing unit that has a support body and a chain tensioning spring being rotatably assembled on a pivot;
    a mobile unit, comprising a chain guide;
    a primary actuation means configured to move the mobile unit with respect to the support unit so as to impart onto the chain guide a primary displacement having at least a component in an axial direction with respect to an axis (Z) of the assembly of toothed wheels; and,
    a secondary actuation means configured to move the mobile unit with respect to the support unit so as to impart onto the chain guide a secondary displacement having at least a component in a radial direction with respect to the axis (Z) of the assembly of toothed wheels,
    wherein the secondary actuation means are capable of moving the mobile unit independently of the primary actuation means and the secondary actuation means comprise a linkage for adjusting a preload of the chain tensioning spring, and
    the first fixing unit comprising a first ring rotatably mounted on the pivot, provided with a tooth for resting on the bicycle frame and with a seat in engagement with a first end of the chain tensioning spring; and,
    the linkage for adjusting the preload of the chain tensioning spring comprises:
        a second ring rotatably assembled in the support body and on the pivot, provided with a seat in engagement with a second end of the chain tensioning spring;
        a toothed sector formed on the second ring; and,
        a worm screw in engagement with the toothed sector.

2. The derailleur according to claim 1, wherein:
    the mobile unit comprises a mobile body and a second fixing unit, for assembling the chain guide on the mobile body;
    the chain tensioning spring is provided in at least one of the first fixing unit and the second fixing unit, the chain tensioning spring determining a configuration of the chain guide when engaged with a bicycle transmission chain;
    the linkage of the secondary actuation means determines a variation of the configuration of the chain guide that involves the secondary displacement of the chain guide.

3. The derailleur according to claim 2, wherein the derailleur is of an articulated parallelogram type, with one fixed side and one mobile side opposite to the fixed side and connected to it by two connecting rods of equal length, wherein the fixed side is formed by the support body and the mobile side is formed by the mobile body.

4. The derailleur according to claim 2, wherein:
    the second fixing unit comprises:
        a pivot assembled in the mobile body, the chain guide and the chain tensioning spring being rotatably assembled on the pivot; and a seat formed in the chain guide, in engagement with a first end of the spring; and, the linkage for adjusting the preload of the chain tensioning spring comprises:

a ring rotatably assembled in the mobile body and provided with a seat in engagement with a second end of the chain tensioning spring;

a toothed sector formed on the ring; and a worm screw in engagement with the toothed sector.

5. The derailleur according to claim 1, wherein the primary actuation means comprise a first electric motor and the secondary actuation means comprise a second electric motor.

6. The derailleur according to claim 1, wherein:

the primary actuation means and the secondary actuation means comprise a single shared electric motor; and, a transmission is provided for having a primary output and a secondary output respectively associated with the primary actuation means and with the secondary actuation means.

7. The derailleur according to claim 6, wherein the transmission comprises:

a primary shaft set in rotation by the single electric motor, a primary toothed wheel fixedly fitted on the primary shaft, a first secondary shaft and a second secondary shaft parallel to one another and to the primary shaft, a first secondary toothed wheel fixedly fitted on the first secondary shaft, a second secondary toothed wheel fixedly fitted on the second secondary shaft, an auxiliary toothed wheel assembled in an axially mobile manner along an auxiliary axis (A) parallel to the primary and secondary shafts in meshed engagement permanently with the primary toothed wheel and selectively with one and/or the other of the secondary toothed wheels.

8. The derailleur according to claim 7, wherein a reduction stage is arranged between the electric motor and the primary shaft.

9. The derailleur according to claim 7, wherein the auxiliary toothed wheel is fixedly fitted onto an auxiliary shaft, rotatably carried by a slide guided in a mobile manner along the auxiliary axis (A).

10. The derailleur according to claim 9, wherein said slide is actuated by an electromagnetic actuator.

11. The derailleur according to claim 10, wherein the electromagnetic actuator comprises a push-pull electromagnet.

12. A derailleur of a bicycle gearshift, comprising:

a support, configured to be mounted on a bicycle frame at an assembly of coaxial toothed wheels, that supports a mobile chain guide, the support includes a first fixing unit that has a support body and a chain tensioning spring being rotatably assembled on a pivot;

a primary actuator for moving the chain guide through a primary displacement having a component in an axial direction with respect to an axis (Z) of the assembly of toothed wheels; and, a secondary actuator for moving the chain guide through a secondary displacement having at least a component in a radial direction with respect to the axis (Z) of the assembly of toothed wheels, wherein the secondary actuator is capable of moving the chain guide independently of the primary actuator and the secondary actuator comprises a linkage for adjusting a preload of the chain tensioning spring, and the first fixing unit comprising a first ring rotatably mounted on the pivot, provided with a tooth for resting on the bicycle frame and with a seat in engagement with a first end of the chain tensioning spring; and, the linkage for adjusting the preload of the chain tensioning spring comprises:

a second ring rotatably assembled in the support body and on the pivot, provided with a seat in engagement with a second end of the chain tensioning spring;

a toothed sector formed on the second ring; and, a worm screw in engagement with the toothed sector.

13. The derailleur according to claim 12, wherein the primary displacement is generally perpendicular to the second displacement.

* * * * *